United States Patent
Youn et al.

(10) Patent No.: US 12,335,430 B2
(45) Date of Patent: Jun. 17, 2025

(54) COMMUNICATION ASSOCIATED WITH MULTI-ACCESS PDU SESSION

(71) Applicant: LG Electronics Inc., Seoul (KR)

(72) Inventors: Myungjune Youn, Seoul (KR); Sungduck Chun, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 17/797,928

(22) PCT Filed: Feb. 1, 2021

(86) PCT No.: PCT/KR2021/001284
§ 371 (c)(1),
(2) Date: Aug. 5, 2022

(87) PCT Pub. No.: WO2021/157974
PCT Pub. Date: Aug. 12, 2021

(65) Prior Publication Data
US 2023/0132058 A1   Apr. 27, 2023

(30) Foreign Application Priority Data

Feb. 6, 2020  (KR) .................... 10-2020-0014508
Feb. 13, 2020 (KR) .................... 10-2020-0017946
Feb. 18, 2020 (KR) .................... 10-2020-0019560

(51) Int. Cl.
*H04M 15/00* (2024.01)
*H04W 28/12* (2009.01)

(52) U.S. Cl.
CPC ........... *H04M 15/66* (2013.01); *H04W 28/12* (2013.01)

(58) Field of Classification Search
CPC ..... H04M 15/66; H04M 15/60; H04W 28/12; H04W 4/24; H04W 28/02; H04W 76/16;
(Continued)

(56) References Cited

U.S. PATENT DOCUMENTS

2022/0330080 A1* 10/2022 Lu ..................... H04W 28/0257
2023/0247705 A1*  8/2023 Kumar ................... H04W 8/24
                                                370/329
2024/0259857 A1*  8/2024 Zhu ................... H04W 28/0263

FOREIGN PATENT DOCUMENTS

WO    WO2018007214        1/2018

OTHER PUBLICATIONS

De Souza, Caio B. Bezerra, et al. "Analysis of power consumption in 4g volte and 5g vonr over ims network." 2022 IEEE 27th International Workshop on Computer Aided Modeling and Design of Communication Links and Networks (CAMAD). IEEE, 2022. (Year: 2022).*

(Continued)

*Primary Examiner* — Sharad Rampuria
(74) *Attorney, Agent, or Firm* — Fish & Richardson P.C.

(57) ABSTRACT

One disclosure of the present specification provides a method for performing, by a network node, communication associated with an MA PDU session. The method may comprise the steps of: receiving information indicating that PS data off has been activated for an MA PDU session of a UE; updating a PCC rule on the basis of the information indicating that the PS data off has been activated for the MA PDU session; and transmitting the updated PCC rule to an SMF.

9 Claims, 27 Drawing Sheets

(58) Field of Classification Search
CPC ...... H04W 76/20; H04W 80/10; H04L 12/14; H04L 12/1407
See application file for complete search history.

(56) References Cited

OTHER PUBLICATIONS

Robitzsch, Sebastian, et al. "Formation and Assertion of Data Unit Groups in 3GPP Networks with TSN and PDU Set Support." 2024 IEEE Wireless Communications and Networking Conference (WCNC). IEEE, 2024. (Year: 2024).*
Ericsson, "Applicability of Data off to Non-3GPP PDU Session and Multi Access PDU Session," S2-2000287, SA WG2 Meeting #S2-136AH, Jan. 13-17, 2020, Incheon, South Korea, 2 pages.
Kang et al., "3GPP 5G System Access Traffic Steering Standard Technology Trends," Weekly ICT Trends, Jun. 12, 2019, 86 pages (with English translation).
Nokia & Nokia Shanghai Bell, "Correcting AMF behaviour for Service Request that is not integrity protected," S2-1903668, Presented at SA WG2 Meeting #132, Apr. 8-12, 2019, Xi'an, PRC, 376 pages.

* cited by examiner

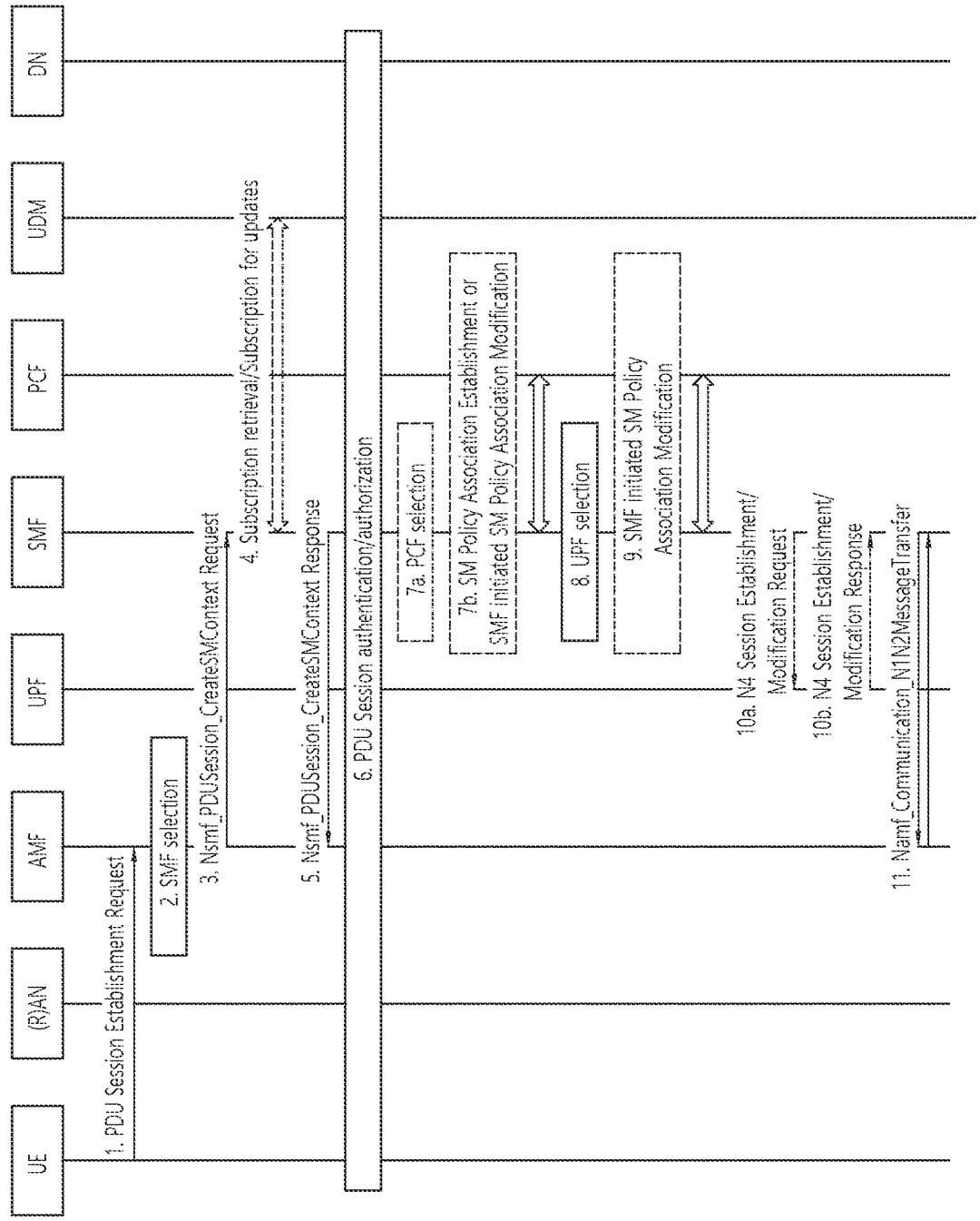

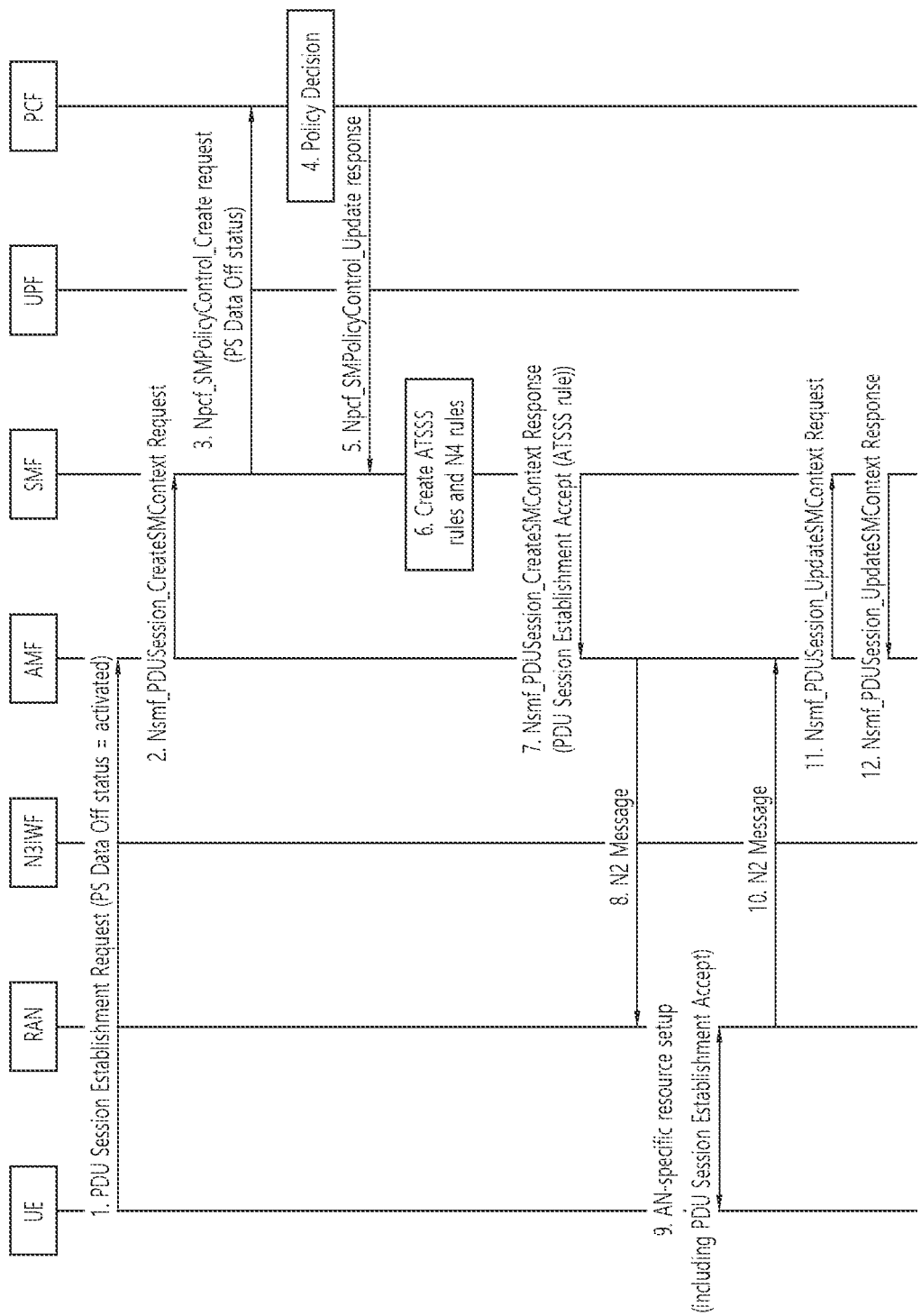

COMMUNICATION ASSOCIATED WITH MULTI-ACCESS PDU SESSION

CROSS-REFERENCE TO RELATED APPLICATIONS

This application is a National Stage application under 35 U.S.C. § 371 of International Application No. PCT/KR2021/001284, filed on Feb. 1, 2021, which claims the benefit of Korean Patent Application No. 10-2020-0014508, filed on Feb. 6, 2020, Korean Patent Application No. 10-2020-0017946, filed on Feb. 13, 2020, and Korean Patent Application No. 10-2020-0019560, filed on Feb. 18, 2020. The disclosures of the prior applications are hereby incorporated by reference herein in their entirety.

TECHNICAL FIELD

The present specification relates to mobile communications.

BACKGROUND

3rd generation partnership project (3GPP) long-term evolution (LTE) is a technology that enables high-speed packet communications. Many initiatives have been proposed for LTE goals, including those aimed at reducing user and provider costs, improving service quality, and expanding and improving coverage and system capacity. 3GPP LTE requires lower cost per bit, improved service availability, flexible use of frequency bands, simple structure, open interface, and proper power consumption of the terminal as upper-level requirements.

Work has begun at the International Telecommunication Union (ITU) and 3GPP to develop requirements and specifications for New Radio (NR) systems. 3GPP must identify and develop the technology components needed to successfully standardize a new Radio Access Technology (RAT) satisfying both urgent market needs and the long-term requirements determined in the ITU-R (International Mobile Telecommunications) international mobile telecommunications (IMT)-2020 process. In addition, NR must be able to use a spectral band in the range of at least 100 GHz that can be used for wireless communications even further into the future.

NR aims to be a single technology framework that covers all usage scenarios, requirements and deployment scenarios, including enhanced mobile broadband (eMBB), massive machine-type-communications (mMTC), ultra-reliable and low latency communications (URLLC), and more. NR may be essentially forward compatible.

Meanwhile, in 5G mobile communication, the 3rd Generation Partnership Project (3GPP) Packet Switch (PS) Data Off function may be used. Discussion is ongoing that 3GPP PS Data Off should be supported even for Multi Access (MA) Packet Data Unit (PDU) sessions. However, conventionally, when 3GPP PS Data Off is used for the MA PDU session, a method for supporting efficient communication has not been discussed.

SUMMARY

Accordingly, a disclosure of the present specification has been made in an effort to solve the aforementioned problem.

In order to solve the above problems, one disclosure of the present specification provides a method for a network node to perform communication related to an MA PDU session. The method includes: receiving information indicating that PS Data Off is activated for the MA PDU session of the UE; updating a PCC rule based on the information indicating that the PS Data Off is activated for the MA PDU session; and transmitting the updated PCC rule to the SMF.

In order to solve the above problems, one disclosure of the present specification provides a method for a UE to perform communication related to a MA PDU session. The method includes activating PS Data Off for the MA PDU session; transmitting a message including information indicating that the PS Data Off is activated for the MA PDU session; and receiving a message including an ATSSS rule in response to the message.

In order to solve the above problems, one disclosure of the present specification provides a network node that performs communication related to a MA PDU session. The network node includes at least one processor; and at least one memory that stores instructions and is operably electrically connectable with the at least one processor, wherein the operations performed based on the instructions being executed by the at least one processor include: receiving information indicating that PS Data Off is activated for the MA PDU session; updating a PCC rule based on the information indicating that the PS Data Off is activated for the MA PDU session; and transmitting the updated PCC rule to the SMF.

In order to solve the above problems, one disclosure of the present specification provides a UE performing communication related to a MA PDU session. The UE includes at least one processor; and at least one memory for storing instructions and operably electrically connectable with the at least one processor, wherein the operations performed based on the instructions being executed by the at least one processor include: activating PS Data Off for a MA PDU session; transmitting a message including information indicating that the PS Data Off is activated for the MA PDU session; and receiving a message including an ATSSS rule in response to the message.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: identifying information that PS Data Off is activated for the MA PDU session of the UE; updating a PCC rule based on the information indicating that the PS Data Off is activated for the MA PDU session; and generating a message including the updated PCC rule.

In order to solve the above problems, one disclosure of the present specification provides a non-volatile computer-readable storage medium in which instructions are recorded. The instructions, when executed by one or more processors, cause the one or more processors to: identify information that PS Data Off has been activated for the MA PDU session of the UE; updating a PCC rule based on the information indicating that the PS Data Off is activated for the MA PDU session; and generating a message including the updated PCC rule.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 11a and 11b are signal flow diagrams illustrating a PDU session establishment procedure.

FIGS. 15a and 15b show examples of operation of a network and/or a terminal according to a second example of the disclosure of the present specification.

DESCRIPTION OF EXEMPLARY EMBODIMENTS

Figure 1:
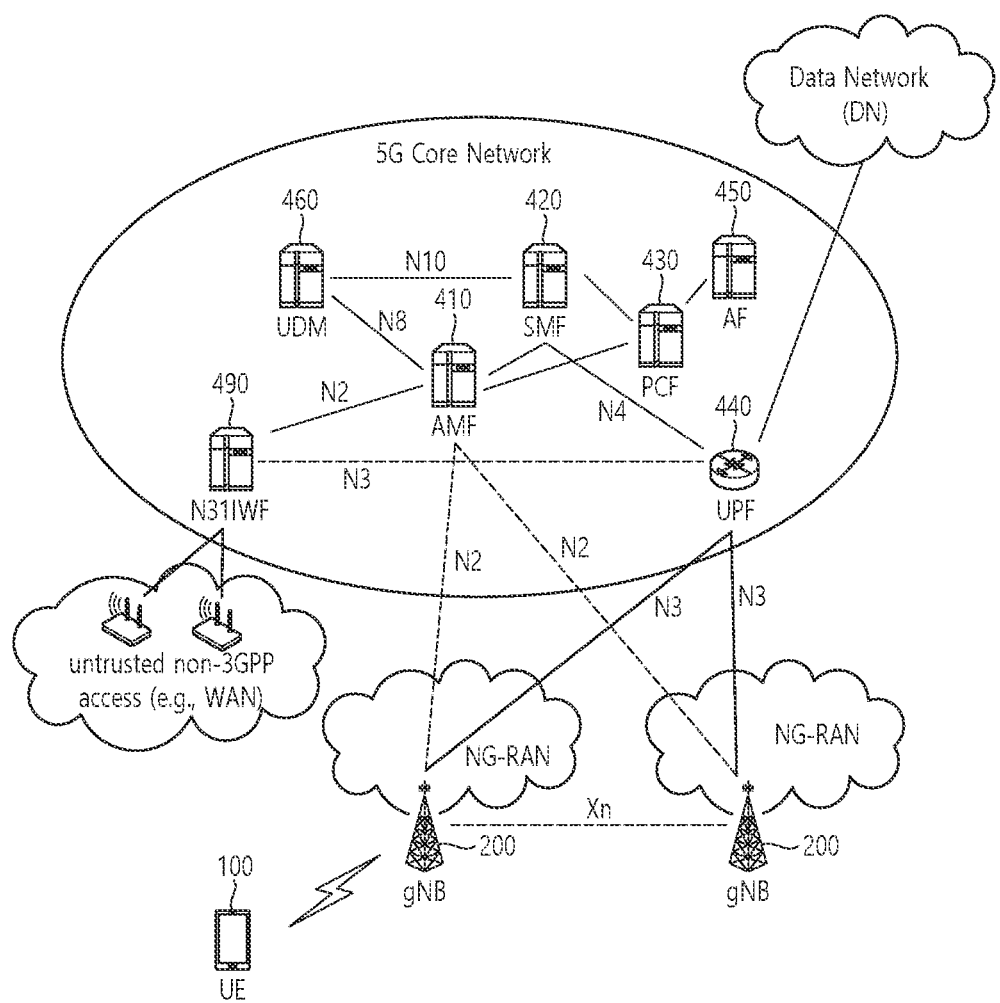
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and it may be called another term such as an evolved-NodeB (eNodeB), an evolved-NodeB (eNB), a BTS (Base Transceiver System), an access point (Access Point), gNB (Next generation NodeB), etc.

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP (3rd Generation Partnership Project) interworking function (N3IWF) 490.

A UE 100 is connected to a data network via the UPF 440 through a Next Generation Radio Access Network (NG-RAN) including the gNB 200.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 200 and the SMF 420. In addition, when the UE 100 moves over an area served by the gNB 200, the UPF 440 serves as a mobility anchor point. The UPF 440 may perform a function of handling a PDU. For mobility within the NG-RAN (which is defined after 3GPP Release-15), the UPF 440 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be called millimeter wave (mmWave).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 4100 MHz to 7125 MHz as shown in Table 2 below. That is, FR1 may include a frequency band of 6 GHz (or 5850, 5900, 5925 MHz, etc.)

or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
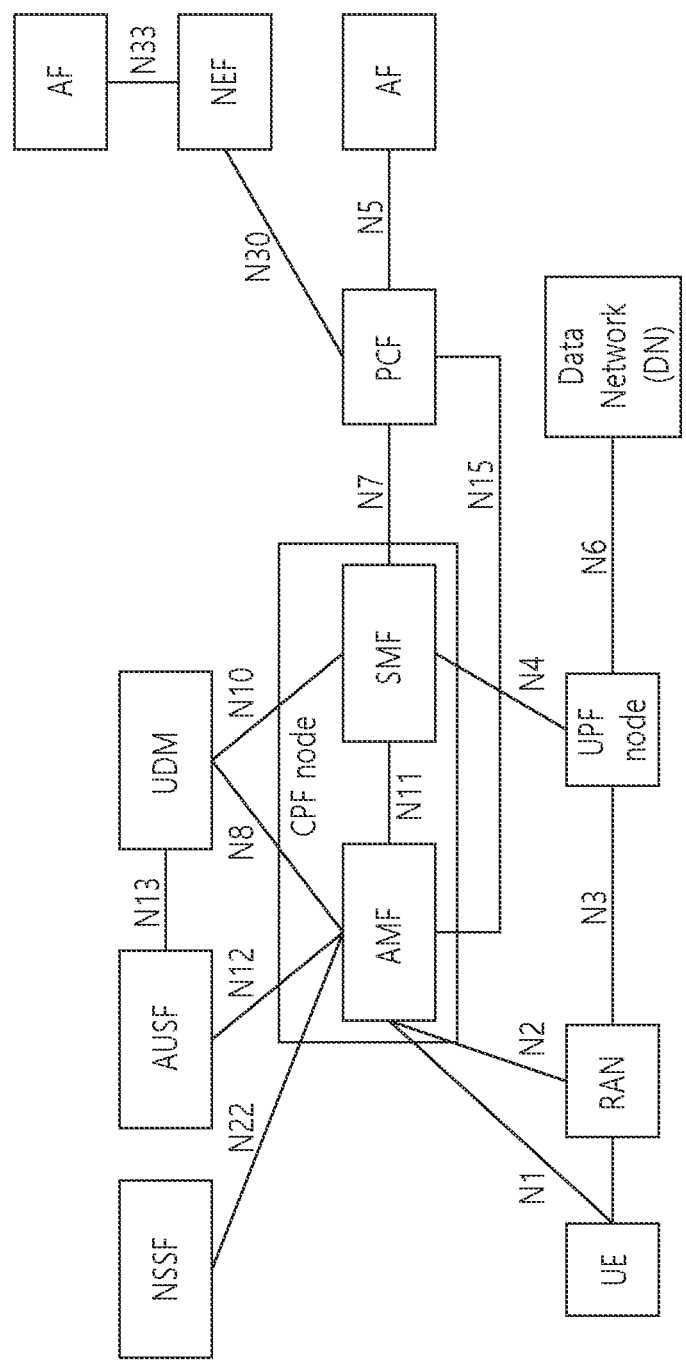
FIG. 2 is an exemplary diagram illustrating an expected structure of next-generation mobile communication from the viewpoint of a node.

FIG. 2 is an exemplary diagram illustrating a predicted structure of a next generation mobile communication in terms of a node. Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
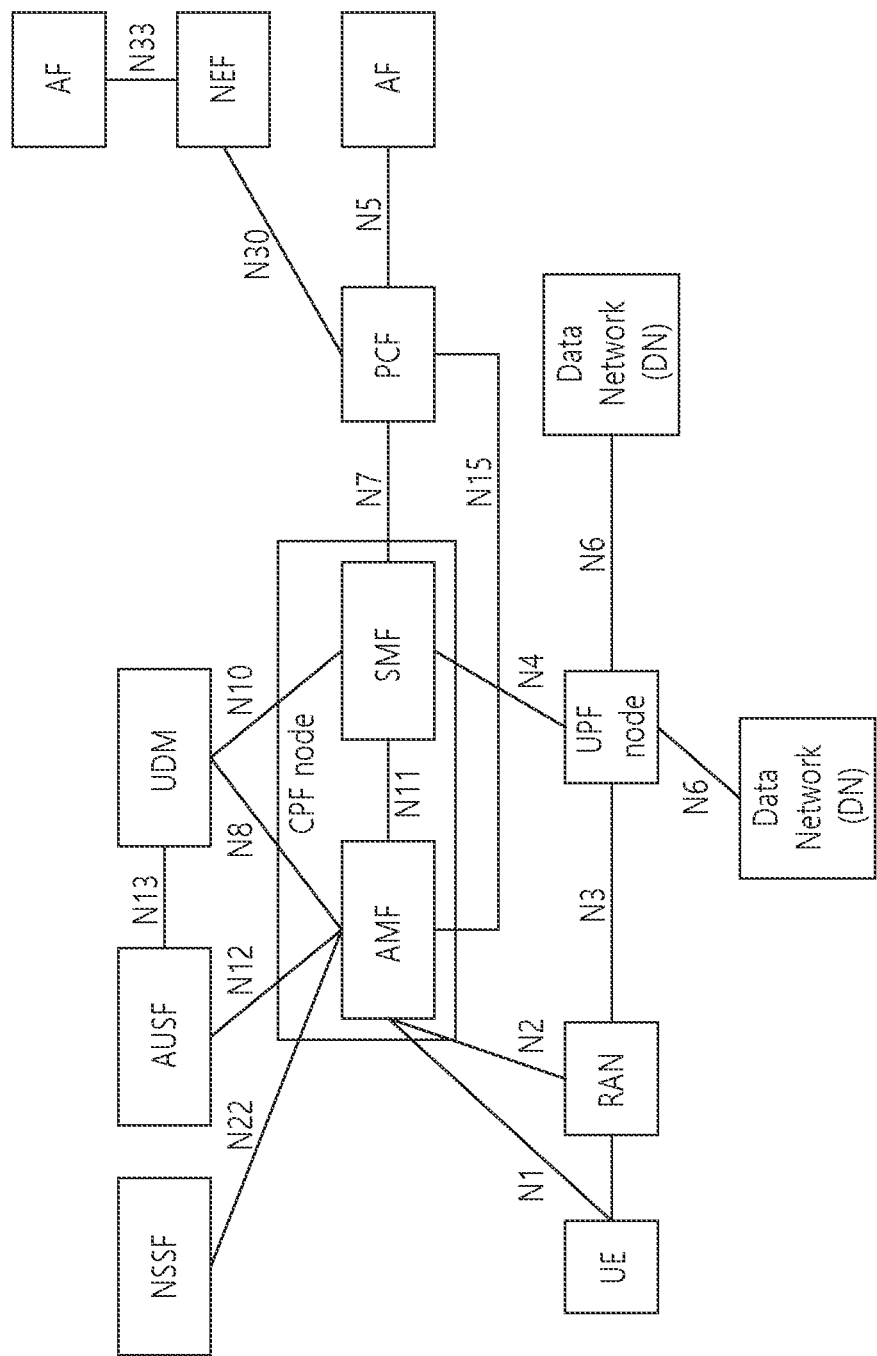
FIG. 3 is an exemplary diagram illustrating an architecture for supporting simultaneous access to two data networks.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
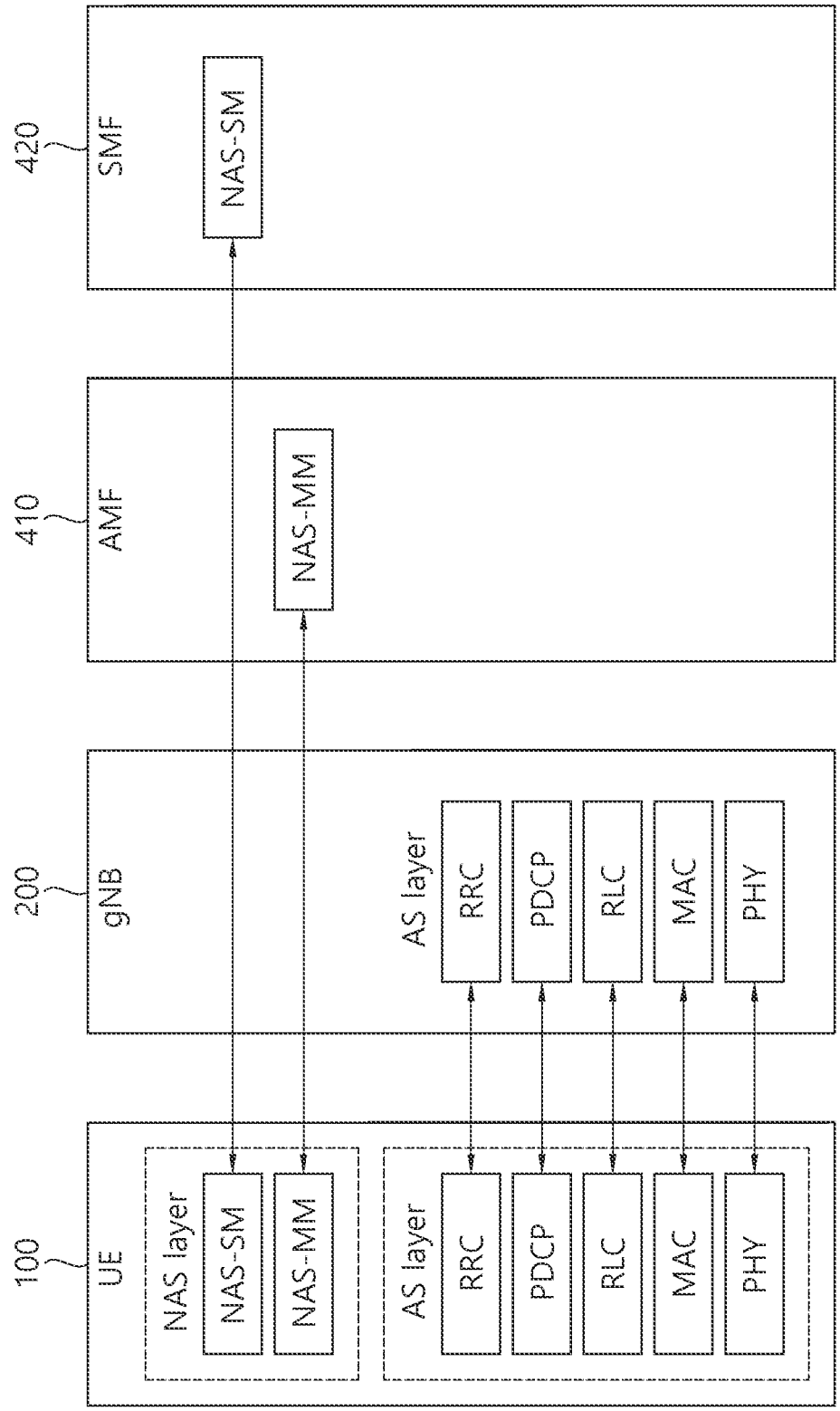
FIG. 4 is another exemplary diagram showing the structure of a radio interface protocol (Radio Interface Protocol) between the UE and the gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
   NAS procedures related to AMF include the following.
   Registration management and access management procedures. AMF supports the following functions.
   Secure NAS signal connection between UE and AMF (integrity protection, encryption)
2) The NAS entity for SM performs session management between the UE and the SMF.
   The SM signaling message is processed, that is, generated and processed, at an NAS-SM layer of the UE and SMF. The contents of the SM signaling message are not interpreted by the AMF.
   In the case of SM signaling transmission,
   The NAS entity for the MM creates a NAS-MM message that derives how and where to deliver an SM signaling message through a security header representing the NAS transmission of SM signaling and additional information on a received NAS-MM.
   Upon receiving SM signaling, the NAS entity for the SM performs an integrity check of the NAS-MM message, analyzes additional information, and derives a method and place to derive the SM signaling message.
   Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving to a new tracking area (TA) whine the UE is in an idle mode, and when the UE needs to perform periodic registration update.

During the initial registration procedure, the ID of the UE may be obtained from the UE. AMF may deliver PEI (IMEISV) to UDM, SMF and PCF.

Figure 5A:
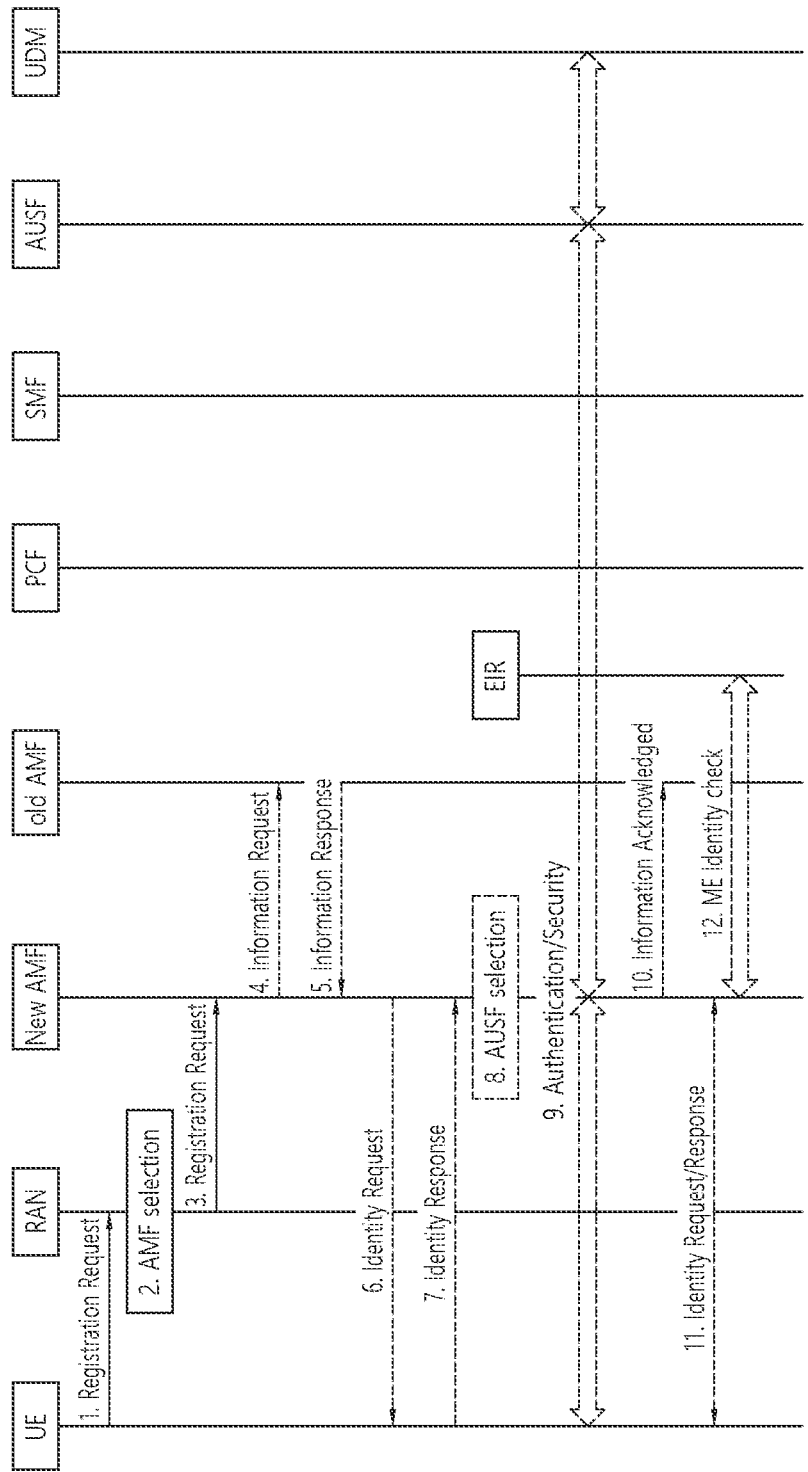
FIGS. 5a and 5b are signal flow diagrams illustrating an exemplary registration procedure.
Figure 5B:
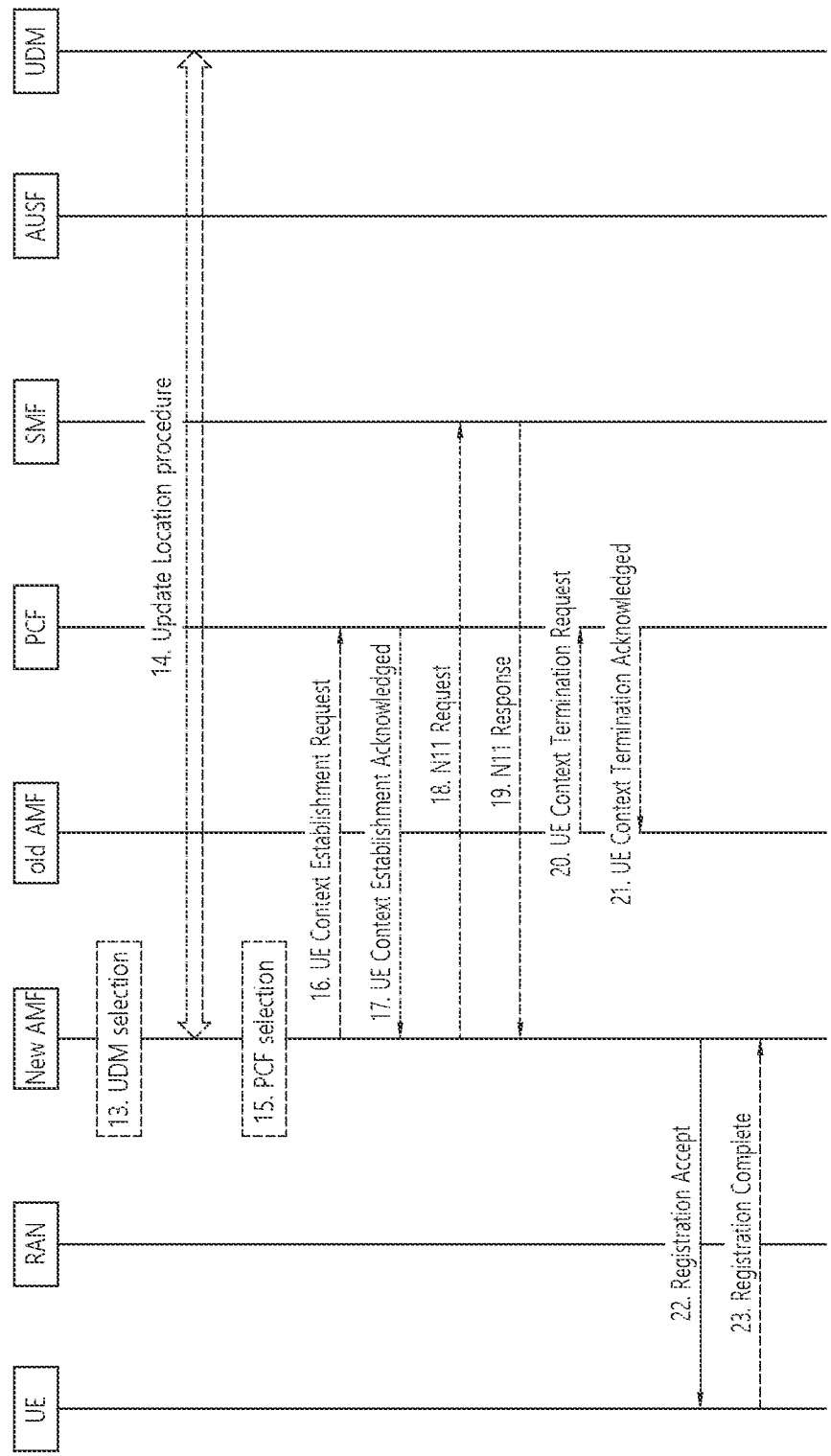

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU (protocol data unit) session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI (Session Network Slice Selection Assistance Information) of the allowed NSSAI (Network Slice Selection Assistance Information) to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU (Protocol Data Unit) Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
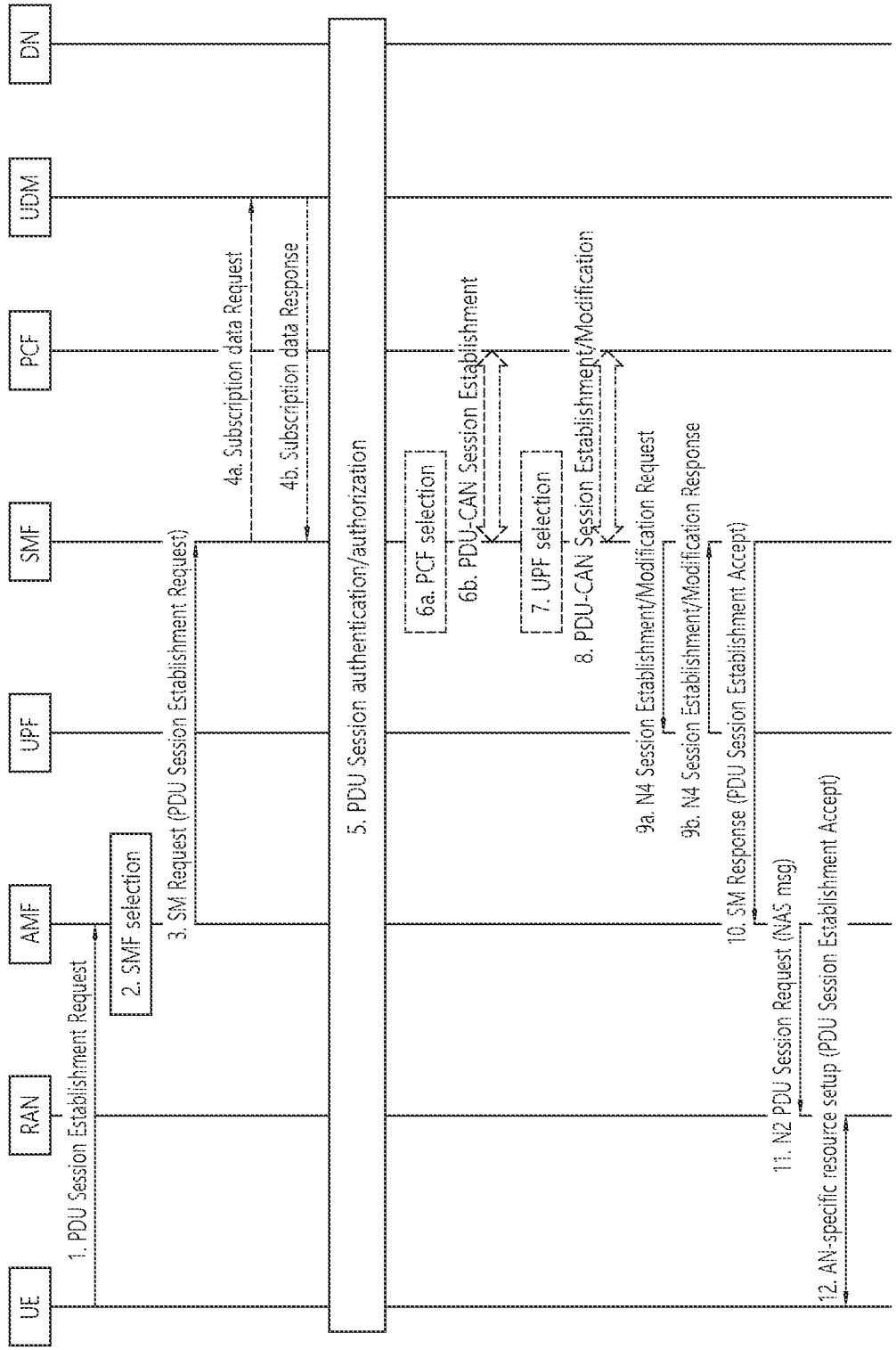
FIGS. 6a and 6b are signal flow diagrams illustrating an exemplary PDU session establishment procedure.
Figure 6B:
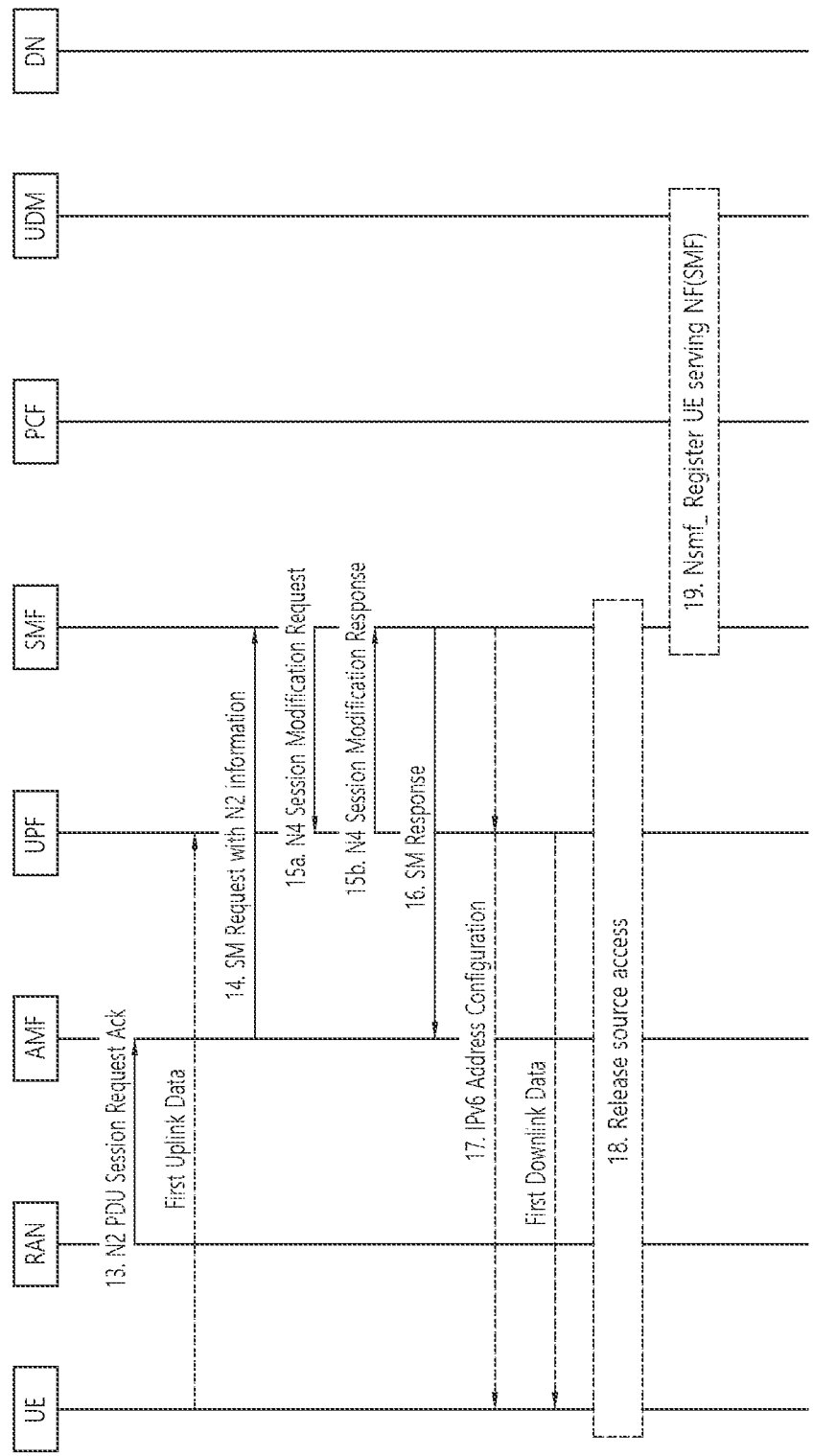

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<PDU Session Modification Procedure>

Figure 7A:
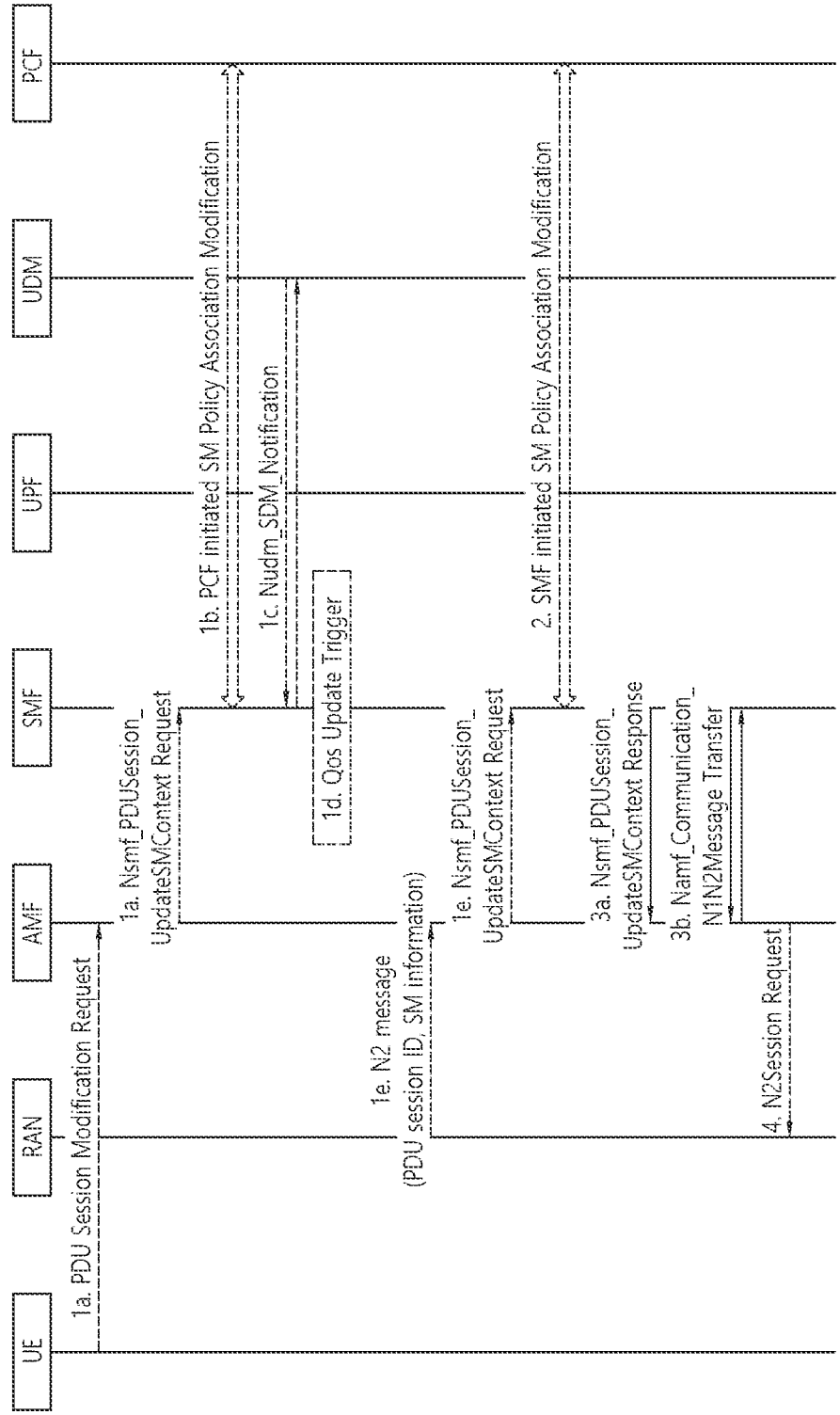
FIGS. 7a and 7b are signal flow diagrams illustrating an exemplary PDU session modification procedure.
Figure 7B:
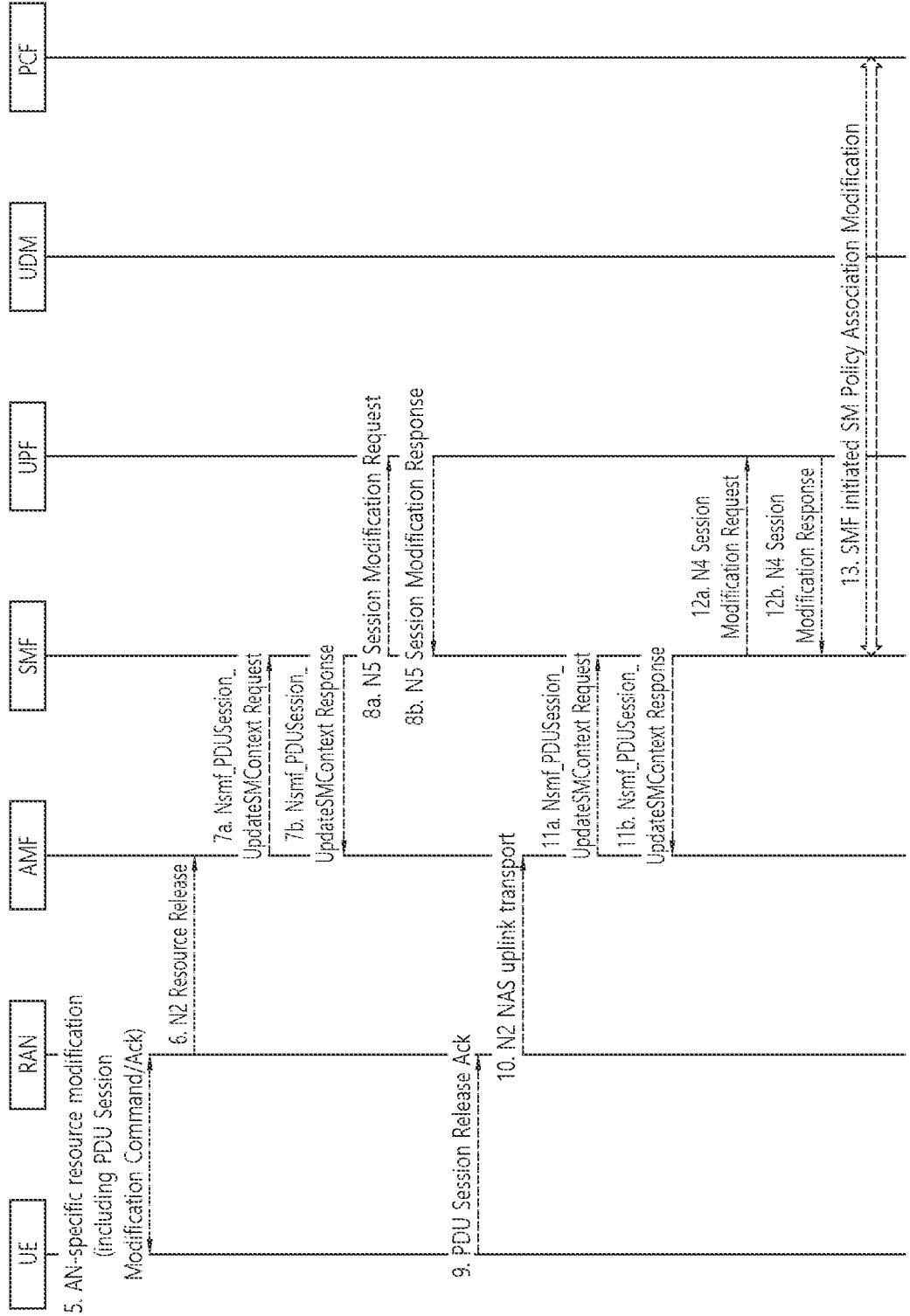

FIGS. 7a and 7b are Signal Flow Diagrams Illustrating an Exemplary PDU Session Modification Procedure.

The PDU session modification procedure may be used when one or more Quality of Service (QoS) parameters exchanged between the UE and the network are modified.

The signal flow diagram shown in FIGS. 7a and 7b is an example of a PDU session modification procedure, and specifically, a UE or network requested PDU Session Modification procedure (non-roaming case and roaming with local breakout case) is shown as an example.

An example of a PDU session modification procedure may be triggered by the following exemplary events (steps 1a) to 1e)):

1a) (UE-initiated modification) The UE may initiate a PDU session modification procedure by sending a NAS message.

For example, the UE may send a PDU session modification request message. Here, the NAS message may include an N1 SM container, a PDU session ID, and a UE Integrity Protection Maximum Data Rate. N1 SM container may include PDU session modification request (PDU Session ID, Packet Filters, Operation, Requested QoS, Segregation, 5GSM Core Network Capability, Number of Packet Filters, if Always-on PDU Session is requested, Always-on PDU Session Requested).

Depending on the access type, if the UE was in the CM-IDLE state, a service request procedure may be preceded before this SM-NAS message is transmitted. (Depending on the Access Type, if the UE was in CM-IDLE state, this SM-NAS message is preceded by the Service Request procedure.) (R) AN is delivered to the AMF along with the indication of the user location information (User location Information).

The AMF may invoke the SM context associated with the PDU session update. For example, AMF may call Nsmf_PDUSession_UpdateSMContext. Nsmf_PDUSession_UpdateSMContext may include an SM context ID and an N1 SM container (including a PDU session modification request).

When the UE requests a specific QoS handling for the selected Service Data Flow (SDF), the PDU session establishment request may include a packet filter describing the SDF, the requested packet filter operation (add, modify or delete) for the indicated packet filter, and the requested QoS. The PDU session establishment request may optionally include a Segregation indication. When the UE requests the network to bind the applicable SDF to a distinct and dedicated QoS Flow (eg, even if an existing QoS flow can support the requested QoS), segregation indication may be included in the PDU session establishment request. The network must comply with the UE's request, but the network may bind the selected SDF for the existing QoS flow instead of the UE's request.

Note 1: Only one QoS flow can be used for traffic segregation. When the UE makes a subsequent request for segregation of the additional SDF, the additional SDF is multiplexed in the existing QoS flow used for segregation.

If the UE is outside the availability area of the LADN (Local Area Data Network), the UE does not trigger a PDU session modification procedure for the PDU session corresponding to the LADN.

For a PDU session established in EPS, when the UE first moves from EPS to 5GS, when the UE wants to change the PDU session to an always-on PDU session, the UE may include an indication that an Always-on PDU session is requested in the PDU session modification request message.

1b) (Modification requested by PCF) The PCF may perform a PCF initiated SM Policy Association Modification procedure to notify the SMF of the modification of the policy. The PCF-initiated SM policy association modification procedure may be triggered, for example, by a policy decision or may be triggered when an application function (AF) requests.

1c) (Modification requested by SMF) The UDM may use Subscriber Data Management (SDM) notifications to update the subscription data of the SMF. For example, the SDM notification may be Nudm_SDM_Notification (including Subscription Permanent Identifier (SUPI) and Session Management Subscription Data). The SMF may acknowledge by updating the session management subscription data and returning SUPI and Ack.

1d) (Modification requested by SMF) The SMF may decide to modify the PDU session. Step 1d) may also be triggered from a locally configured policy or (R)AN. Step 1d) may also be triggered when the SMF marks that the UP (User Plane) connection is active and the status of one or more QoS flows has been deleted in 5GC but not synchronized with the UE.

When the SMF receives one of the triggers of steps 1b) to 1d), the SMF may initiate a PDU session modification procedure requested by the SMF.

1e) (AN-initiated modification) Regardless of whether a notification control is set or not, when an AN resource to which a QoS flow is mapped is released, (R)AN must indicate to the SMF. (R) AN may transmit an N2 message (including PDU session ID and N2 SM information) to the AMF. The N2 SM information may include a QoS flow ID (QFI), user location information, and an indication that a QoS flow has been released.

The AMF may call the SM context request associated with the update of the PDU session. For example, the AMF may invoke Nsmf_PDUSession_UpdateSMContext (including SM context ID and N2 SM information).

(AN Initiated Notification Control) When notification control is set for a GBR flow, if (R)AN determines that the QoS target of the QoS flow cannot be met or that the QoS target of the QoS flow can be met again, respectively, (R)AN may transmit an N2 message (including PDU session ID and N2 SM information) to the SMF. The N2 SM information may include an indication that the QoS target of the QFI and QoS flow cannot be met or an indication that the QoS target of the QoS flow may be met again, respectively. The AMF may call the SM context request associated with the update of the PDU session. For example, the AMF may invoke Nsmf_PDUSession_UpdateSMContext (including SM context ID and N2 SM information). When the PCF subscribed to the event, the SMF may report this event to the PCF for each PCC rule for which notification control is set (see step 2). Alternatively, if the dynamic PCC does not apply to this DNN and depends on a locally set policy, the SMF may initiate the PDU session modification procedure requested by the SMF as in the example of step 3b).

2) The SMF may report some subscribed events to the PCF by performing the SMF initiation SM policy association modification procedure. Step 2) may be omitted when the PDU session modification procedure is triggered by step 1b or 1d. If the dynamic PCC is not deployed (deployed), the SMF may apply a local policy to determine whether to change the QoS profile.

Steps 3) to 7) may not be invoked when only an operation (eg gating) in UPF is required for PDU session modification.

3a) For UE-initiated modification or AN-initiated modification, SMF may respond to AMF via PDU session update SM context. For example, the PDU session update SM context may be Nsmf_PDUSession_UpdateSMContext. Nsmf_PDUSession_UpdateSMContext may include N2 SM information (PDU session ID, QFI, QoS profile, session-Aggregate Maximum Bit Rate (AMBR)), and N1 SM container (including PDU Session Modification Command). PDU session modification command may include PDU session ID, QoS rule, QoS rule operation, QoS flow level QoS parameters if necessary for QoS related to QoS rule, Session-AMBR, Always-on PDU Session Requested if Always-on PDU Session is requested.

When PDU session modification has been requested by the UE, in order to modify the PDU session always-on PDU session, the SMF may include an Always-on PDU Session Granted indication in the PDU session modification command. The Always-on PDU session grant indication may be included to indicate whether the PDU session is changed to an Always-on PDU session or not.

The N2 SM information may carry information to be provided by the AMF to the (R)AN. To notify the (R)AN that one or more QoS flows have been added or modified, the N2 SM information may include a QoS profile and a corresponding QFI. The N2 SM information may include only the QFI to notify the (R)AN that one or more QoS flows have been removed. If the PDU session modification is triggered by the (R)AN release of step 1e), the SM information may carry the acknowledgment of the (R)AN release. When the UE requests a PDU session modification for a PDU session without an established user plane resource, the N2 SM information provided to (R)AN may include information for establishing a user plane resource.

The N1 SM container carries the PDU session modification command that the AMF should provide to the UE. In order to notify the UE that one or more QoS rules have been added, removed, or modified, the N1 SM container may include QoS rules, QoS rules and QoS related QoS rules operations, if necessary, QoS flow level QoS parameters and QoS flow level QoS parameter operation.

3b) For the modification requested by the SMF, the SMF may invoke Namf_Communication_NIN2MessageTransfer. Namf_Communication_NIN2MessageTransfer may include N2 SM information (PDU session ID, QFI(s), QoS Profile(s), session-AMBR), and N1 SM container (including PDU session modification command). The PDU session modification command may include PDU session ID, QoS rules, QoS rules and QoS flow-level QoS parameters if necessary for QoS related to QoS rules operation and QoS rules, session-AMBR.

When the UE is in the CM-IDLE state and Asynchronous Type Communication (ATC) is activated, the AMF may update and store the UE context based on Namf_Communication_N1N2MessageTransfer, and steps 4) to 7) may be omitted. For reference, when the ATC mode is activated, paging is not performed for the UE in the IDLE state. When the UE is reachable (eg, when the UE enters the CM-CONNECTED state), the AMF may forward an N1 message to synchronize the UE and the UE context.

4) AMF may transmit an N2 PDU session request message to (R)AN. The N2 PDU session request may include N2 SM information received from the SMF, a NAS message (including a PDU session ID, and an N1 SM container (including a PDU session modification command)).

5) (R)AN may issue an AN specific signaling exchange with the UE related to information received from the SMF. For example, in the case of NG-RAN, RRC Connection Reconfiguration may occur when the UE modifies necessary (R)AN resources related to the PDU session.

(R)AN may acknowledge the N2 PDU session request by sending an N2 PDU session Ack message to the AMF. The N2 PDU session Ack message may include N2 SM information (list of accepted/rejected QFIs, AN tunnel information, PDU session ID, Secondary RAT using data) and user location information. In the case of Dual Connectivity, when one or more QFIs are added to a PDU session, the master RAN node transmits one or more QFIs of these QFIs to the NG-RAN node (the NG-RAN that was not previously involved in the PDU session) node) can be assigned. In this case, the AN tunnel information may include a new N3 tunnel endpoint for the QFI allocated to the new NG-RAN node. Accordingly, when one or more QFIs are removed from the PDU session, the (R)AN node is no longer involved in the PDU session, and the corresponding tunnel endpoint is removed from the AN tunnel information. If the QFI cannot meet the user plane security enhancement information for the corresponding QoS profile (eg, due to the UE Integrity Protection Maximum Data Rate being exceeded), the NG-RAN may reject the QFI.

When the PLMN sets a second RAT usage reporting, the NG-RAN node may provide a RAN usage data report.

7) AMF may deliver N2 SM information and user location information received from AN to SMF through Nsmf_PDUSession_UpdateSMContext service operation. The SMF may reply to the AMF with an Nsmf_PDUSession_UpdateSMContext response. The N2 SM information may include second RAT usage data.

When (R)AN rejects the QFI, the SMF is responsible for updating the QoS flow level QoS parameters if necessary for the QoS rules at the UE and the QoS flows associated with the QoS rules.

8) The SMF may update the N4 session of the UPF related to the PDU session modification by sending the N4 session modification request message to the UPF (refer to Note 3).

When a new QoS flow is generated, the SMF may update the UPF with UL Packet Detection Rules of the new QoS flow.

Note 2: UL packets with QFI of new QoS flow may be delivered via update.

9) The UE may acknowledge the PDU session modification command by sending a NAS message. The NAS message may include a PDU session ID and an N1 SM container (including PDU session modification command Ack).

10) (R)AN may forward NAS message to AMF.

11) AMF may transmit N1 SM container (including PDU session modification command Ack) and user location information received from AN to SMF through Nsmf_PDUSession_UpdateSMContext service operation.

The SMF may reply using the Nsmf_PDUSession_UpdateSMContext response.

If the SMF-initiated PDU session modification procedure is to delete QoS flows that do not contain QoS flows associated with the default QoS rules (eg, when triggered by PCF), and the SMF does not receive a response from the UE, the SMF marks the state of these QoS flows to be synchronized with the UE.

12) The SMF may update the N4 session of the UPF that is not related to the modification of the PDU session by sending the N4 session modification request message (including the N4 session ID) to the UPF. For a PDU session of the Ethernet PDU session type, the SMF may notify the UPF to add or remove an Ethernet Packet Filter Set and a forwarding rule(s).

Note 3: UPFs affected by the PDU session modification procedure depend on the modified QoS parameters and deployment. For example, when the session AMBR of a PDU session having a UL CL (Uplink Classifier) is changed, only the UL CL may be related. This note can also be applied to step 8).

13) When the SMF interacts with the PCF in step 1b) or 2), the SMF may perform the SMF-initiated SM policy association modification procedure to notify the PCF whether the PCC decision is enforced or cannot be enforced.

The SMF may notify any entity subscribed to the user location information related to the PDU session change.

When step 1b) is triggered to perform an application function effect on traffic routing, the SMF may re-establish the user plane of the PDU session.

<Multi-Access (MA) PDU Session>

In the prior art, the MA PDU session is a session that can be serviced simultaneously with 3GPP access and non-3GPP access using one PDU session.

Figure 8:
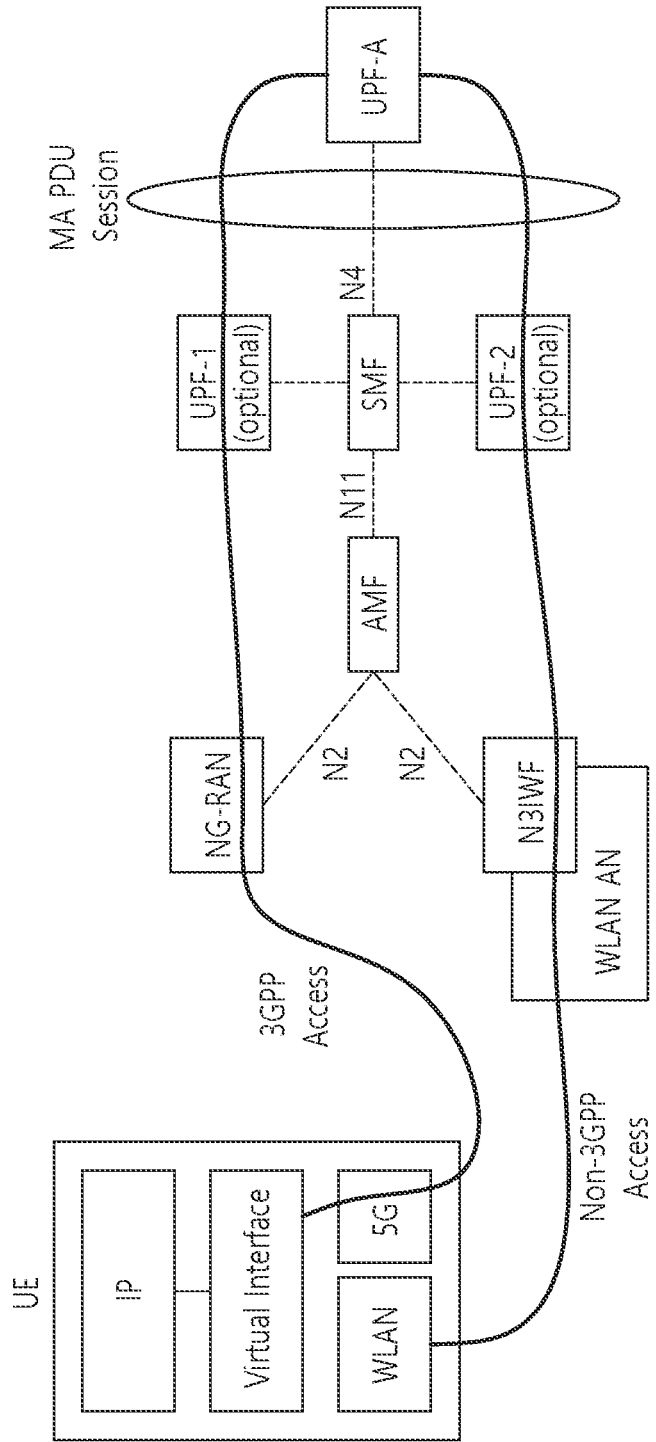
FIG. 8 shows an example in which an MA PDU session is generated.

FIG. 8 shows an example in which a MA PDU session is generated.

In FIG. 8, the MA PDU session is one PDU session and has a separate session tunnel for each access. One is established on 3GPP access, and the other PDU session is established on untrusted non-3GPP access (e.g., WLAN AN).

Since the MA PDU session is one session, the MA PDU session has the following characteristics.

(i) one DNN;
(ii) one UPF Anchor (UPF-A);
(iii) one PDU type (e.g., IPv6);
(iv) one session IP address
(v) one SSC mode
(vi) one HPLMN S-NSSAI.

The MA PDU session enables a multipath data link between the UE and UPF-A. This can be implemented below the IP layer.

A MA PDU session may be established through one of the following procedures.

(i) It can be established through two separate PDU session establishment procedures. This is called individual establishment.

(ii) It may be established through one MA PDU session establishment procedure. That is, the MA PDU session is simultaneously established in two accesses with one session establishment request. This is called binding establishment.

After the MA PDU session is established, Session Management (SM) signaling related to the MA PDU session may be transmitted and received through random access.

A. Individual Establishment of MA PDU Session

A MA PDU session may be established through two separate PDU session establishment procedures. For example, the UE may establish a MA PDU session on 3GPP access, and then perform a PDU session establishment procedure on non-3GPP access in order to add non-3GPP access to the MA PDU session created on 3GPP access. The request type in the establishment request message for adding the second access may be set to "MA PDU Request".

B. Binding Establishment.

A MA PDU session may be simultaneously established for 3GPP access and non-3GPP access through one procedure. Such one procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

Figure 9:
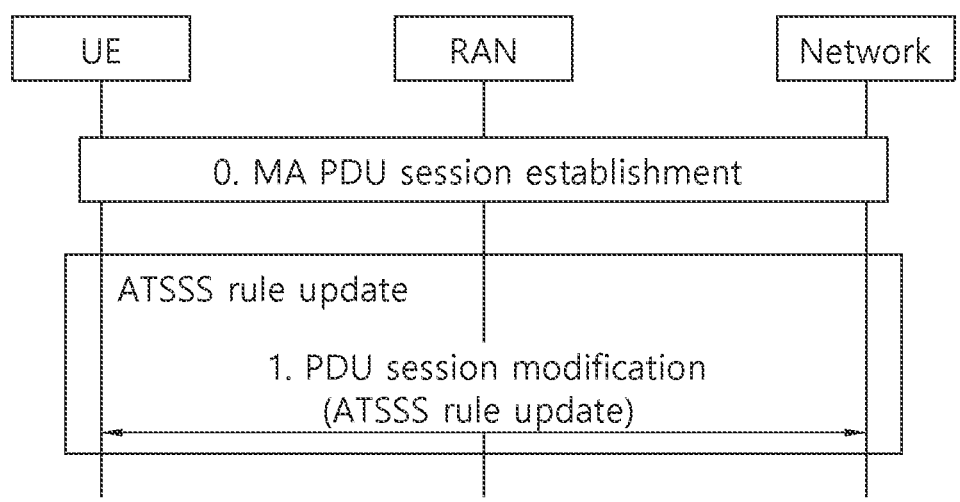
FIG. 9 shows an example of applying the ATSSS rule to the MA PDU session.

FIG. 9 shows an example of applying the ATSSS rule to the MA PDU session.

Referring to FIG. 9, if the SMF wants to move an IP flow transmitted to non-3GPP access to 3GPP access in a state in which a multi-access (MA) PDU session is established, through 3GPP access, updated ATSSS (Access Traffic Steering, Switching and Splitting) rules can be transmitted.

<Access Traffic Steering, Switching & Splitting (ATSSS)>

The ATSSS function may be an optional feature supported by the UE and the 5GC network.

The ATSSS function may enable a multi-access PDU Connectivity Service. For example, the ATSSS function may exchange PDUs between the UE and the data network by using one 3GPP access network and one non-3GPP access network simultaneously, and using two independent N3/N9 tunnels between the PSA and RAN/AN. The multi-access PDU connection service may be realized by establishing a Multi-Access PDU (MA PDU) Session. The MA PDU session may be, for example, a PDU session with user-plane resources in two access networks.

If the UE is registered through 3GPP and non-3GPP access, or if the UE is registered with only one access, the UE may request a MA PDU session.

After the MA PDU session is established, if user-plane resources exist in both access networks, in order to determine how to distribute uplink traffic through the two access networks, the UE applies network-provided policies (eg, ATSSS rules) and exchange local conditions (eg, network interface availability, signal loss conditions, user preferences, etc.). Similarly, the UPF anchor of the MA PDU session applies the network provision policy (e.g. N4 rule) and feedback information received from the UE through the user plane (e.g. access network unavailability or availability) to determine to distribute downlink traffic to two N3/N9 tunnel and to two access networks. If only one access network has a user plane resource, to trigger the establishment or activation of a user plane resource through the other access, the UE may apply the ATSSS rule, and may consider local conditions.

The MA PDU session type may be, for example, one of IPv4, IPv6, IPv4v6 and Ethernet. Unstructured types may not be supported in the current version.

ATSSS functionality can be supported over any type of access network. Here, all types of access networks may include untrusted non-3GPP access networks and trusted non-3GPP access networks, wireline 5G access networks, and the like. As long as the MA PDU session can be established over any type of access network, the ATSSS function can be supported over any type of access network.

Hereinafter, a function for enabling ATSSS will be described.

First, the MA PDU session will be described. MA PDU sessions can be managed using the session management function with the following additions and modifications:

1) If the UE wants to request a new MA PDU session:
   When the UE is registered in the same PLMN through 3GPP access and non-3GPP access, the UE may transmit a PDU session establishment request message including "MA PDU Request" through one of the two accesses. The AMF may inform the SMF that the UE is registered via both accesses. The AMF notifying the SMF may trigger establishment of user-plane resources in both accesses and two N3/N9 tunnels between the PDU session anchor (PSA) and the RAN/AN.
   When the UE is registered with different PLMNs through 3GPP access and non-3GPP access, the UE may transmit a PDU session establishment request message including "MA PDU Request" through one of the two accesses. After this PDU session is established in one N3/N9 tunnel between the PSA and (R)AN/AN, the UE may transmit a PDU session establishment request message including "MA PDU Request" and the same PDU session ID via the other access. User-plane resources in both accesses and two N3/N9 tunnels between PSA and RAN/AN may be established.
   If the UE is registered through only one access, the UE may transmit a PDU session establishment request message including an indication of "MA PDU Request" through the access in which the UE is registered. One N3/N9 tunnel between PSA and RAN/AN and user-plane resources in this access may be established. After the UE is registered through the second access, the UE may establish user-plane resources in the second access.

In the PDU session establishment request message transmitted to request a new MA PDU session, the UE may provide ATSSS capability information of the UE. ATSSS capability (capabilities) information may include information about the steering mode and steering functionalities supported by the UE.

If the UE indicates that it can support ATSSS-LL (Low Layer) function with any steering mode, and the network accepts to activate this function, the network may provide UE Measurement Assistance Information to the UE. And, the network may provide one or more ATSSS rules to the UE.

The UE indicates that the UE can support the MPTCP function in any steering mode, and can support the ATSSS-LL function only in the Active-Standby steering mode, and the network may accept to activate these functions. In this case, the network provides MPTCP proxy information to the UE, the network may allocate one IP address/prefix for the MA PDU session and two additional IP addresses/prefixes called "link-specific multipath" to the UE. Additionally, the network may provide the UE with UE measurement assistance information and provide the UE with one or more ATSSS rules, including ATSSS rules for non-MPTCP traffic. ATSSS rules for non-MPTCP traffic can use the ATSSS-LL function and Active-Standby steering mode to indicate how non-MPTCP traffic is transmitted over 3GPP access and non-3GPP access in the uplink direction.

If the UE indicates that it can support MPTCP functions with all steering modes and ATSSS-LL functions with all steering modes, and the network accepts to enable these functions, the network may provide MPTCP proxy information to the UE. In addition, the network may allocate one IP address/prefix for the MA PDU session and two additional IP addresses/prefix called "link-specific multipath" to the UE. The network may provide UE measurement assistance information and one or more ATSSS rules to the UE.

If the UE requests S-NSSAI, S-NSSAI shall be allowed in both accesses. Otherwise, the MA PDU session may not be established.

The SMF may determine ATSSS capabilities supported for the MA PDU session, based on ATSSS capabilities provided by the UE and the DNN configuration of the SMF. The SMF may perform the following actions:

a) if the UE includes "MPTCP functionality with any steering mode and ATSSS-LL functionality with only Active-Standby steering mode" in the ATSSS capability; and a-1) If the DNN configuration allows MPTCP and ATSSS-LL for all steering modes, for the MA PDU session, (1) MPTCP and ATSSS-LL may be possible for all steering modes in downlink, (2) uplink MPTCP and ATSSS-LL may be possible in Active-Standby mode; or a-2) If the DNN configuration allows MPTCP for all steering mode and allows ATSSS-LL for Active-Standby mode, for MA PDU session, MPTCP and ATSSS-LL are possible in Active-Standby mode in uplink and downlink.

b) If the UE includes "ATSSS-LL functionality with any steering mode" in the ATSSS capability, and the DNN settings allow ATSSS-LL with any steering mode, the MA PDU session will cover all steering modes in uplink and downlink. ATSSS-LL may be possible.

c) If the UE includes "MPTCP functionality with any steering mode and ATSSS-LL functionality with any steering mode" in the ATSSS capability, and the DNN configuration allow MPTCP and ATSSS-LL for all steering modes, for the MA PDU session, MPTCP and ATSSS-LL may be possible with all steering modes in uplink and downlink.

The SMF may provide the ATSSS capability of the MA PDU session to the PCF while the PDU session establishment procedure is being performed.

Policy and charging control (PCC) rules provided by the PCF may include ATSSS control information. The PCC rule and ATSSS control information may be used by the SMF to derive the ATSSS rule for the UE and the N4 rule for the UPF. For MA PDU session, if dynamic PCC rule is not used, SMF may provide ATSSS rule and N4 rule to UE and UPF, respectively, based on local configuration (eg, local configuration based on DNN or S-NSSAI).

The UE may receive the ATSSS rule from the SMF. The ATSSS rule may indicate how to route uplink traffic through 3GPP access and non-3GPP access. Similarly, the UPF may receive the N4 rule from the SMF. The N4 rule may indicate how to route downlink traffic through 3GPP access and non-3GPP access.

When the SMF receives the PDU session establishment request message including the "MA PDU Request" indication, and if UP security protection is required for the PDU session, the SMF may confirm the establishment of the MA PDU session only if UP security protection requiring 3GPP access can be enforced. The SMF need not to check whether it can enforce UP security protections that require non-3GPP access.

2) After the MA PDU session establishment procedure (ie, after the MA PDU session is established), the following description may be applied:

at any given time, a MA PDU session may have user-plane resources in both 3GPP access and non-3GPP access, may have user-plane resources in only one access, or may not have user-plane resources in any access.

Even if the UE deregisters from one access, AMF, SMF, PCF and UPF can maintain their MA PDU session contexts if the UE is registered with another access When the UE deregisters from one access and the UE is registered for another access, the AMF may inform the SMF that the access type for the MA PDU session has become unavailable. Thereafter, the SMF may inform the UPF that the access type of the deregistered access has become unavailable and that the N3/N9 tunnel for the corresponding access type has been released.

When the UE wants to add a user-plane resource in one access of the MA PDU session (eg, based on access network performance measurement and/or ATSSS rules), the UE may transmit a PDU session establishment request message over this access. Here, the PDU session establishment request message may include a PDU session ID of the MA PDU session and an "MA PDU Request" indication. For this access, if N3/N9 do not exist, N3/N9 for this access may be established.

When the UE wants to re-activate a user-plane resource in one access of the MA PDU session (eg, based on access network performance measurement and/or ATSSS rules), the UE may initiate a UE Triggered Service Request procedure through this access.

3) When the network wants to re-activate the user-plane resource through 3GPP access or non-3GPP access of the MA PDU session, the network may initiate a Network Triggered Service Request procedure.

A MA PDU session may also be established in one of the following cases:

a) when the establishment of the MA PDU session is explicitly requested by the ATSSS-capable UE; or b) If the ATSSS-capable UE requests a single-access PDU session, but the network decides to establish the MA PDU session instead, the MA PDU session may be established. This example may correspond to an optional scenario, this example may occur when a UE that requires single access for a PDU session has requested a single-access PDU session, but when there are no a policy (e.g. UE route selection policy (URSP) rule) and local restrictions.

When the UE moves from EPS to 5GS, a MA PDU session may be established while the PDU session modification procedure is performed.

An ATSSS-capable UE may decide to request a MA PDU session based on the provided URSP rule. In particular, if the URSP rule triggers the UE to establish a new PDU session, and if the access type preference component of the URSP rule indicates "Multi-Access", the UE may request an MA PDU session when the UE applies the URSP rule.

Hereinafter, a policy for ATSSS control will be described.

While the establishment of the MA PDU session is being performed, if a dynamic PCC is used for the MA PDU session, the PCF may perform ATSSS policy determination and create a PCC rule including ATSSS policy control information. Here, the ATSS policy control information may be used to determine how uplink traffic and downlink traffic of the MA PDU session are distributed through 3GPP access and non-3GPP access.

The SMF may receive the PCC rule together with the ATSSS policy control information from the PCF. And, the SMF may map these rules to (a) the ATSSS rule transmitted to the UE and (b) the N4 rule transmitted to the UPF. The ATSSS rule may be a prioritized list of rules that the UE applies to enforce the ATSSS policy in the uplink direction. And, the N4 rule may be applied by the UPF to enforce the ATSSS policy in the downlink direction.

When a MA PDU session is created or the MA PDU session is updated by the SMF (for example, after the SMF receives an updated (or new) PCC rule from the PCF), the ATSSS rule may be transmitted to the UE along with the NAS message. Similarly, the N4 rule may be transmitted to the UPF when a MA PDU session is created or the MA PDU session is updated by the SMF.

For ATSSS, Quality of Service (QoS) may be supported. Hereinafter, QoS support (QoS support) will be described.

The 5G QoS model for single access PDU sessions can also be applied to MA PDU sessions. For example, the QoS flow may be the finest granularity of QoS differentiation in the MA PDU session. Compared to a single-access PDU session, one difference is that in the MA PDU session, there may be separate user plane tunnels between the AN and the PSA, and each user plane tunnel may be related to a specific access (either 3GPP access or non-3GPP access). However, QoS flows may not be associated with a particular access. That is, since QoS flows are access-agnostic, the same QoS can be supported when traffic is distributed through 3GPP access and non-3GPP access. SMF may provide the same QoS Flow ID (QFI) in 3GPP access and non-3GPP access, so that the same QoS is supported in both access.

In ATSSS, the Steering function may be supported. Hereinafter, the Steering function will be described.

The functionality of ATSSS-capable UE (ATSSS-capable UE) that ATSSS-capable UE (ATSSS-capable UE) can steer (coordinate), switch, and split the traffic of the MA PDU session through 3GPP access and non-3GPP access can be referred to as "steering functionality". An ATSSS capable UE may support one or more of the following types of steering functions:

1) A high-layer steering function that operates above the Internet Protocol (IP) layer may be supported. For example, a high-layer steering function "MPTCP functionality" applying a Multipath Transmission Control Protocol (MPTCP) protocol may be supported. Here, this steering function ("MPTCP functionality") can be applied to steer, switch, and split TCP traffic of applications that are allowed to use MPTCP. The MPTCP function of the UE may communicate with the associated MPTCP Proxy function of the UPF via the 3GPP user plane and/or the non-3GPP user plane.

2) A low-layer steering function that operates below the IP layer may be supported. For example, a low-layer steering function called "ATSSS Low-Layer functionality" or ATSSS-LL functionality may be supported. Here, this steering function ("ATSSS Low-Layer functionality" or ATSSS-LL functionality) can be applied to steer, switch, and split any type of traffic (including TCP traffic, User Datagram Protocol (UDP) traffic, Ethernet traffic, etc.). ATSSS-LL functionality must be supported in an Ethernet-type MA PDU session. In the network, one UPF supporting ATSSS-LL must exist in the data path of the MA PDU session.

The UE may indicate to the network the steering function and steering mode supported by the UE by including one of the following in the UE ATSSS Capability:

1) ATSSS-LL functionality with any steering mode. In this case, the UE may indicate that it can steer, switch and split all traffic of the MA PDU session using the ATSSS-LL function with all steering modes.

2) MPTCP functionality with any steering mode and ATSSS-LL functionality with only Active-Standby steering mode. In this case, ATSSS-LL function with only MPTCP function and Active-Standby steering mode with all steering modes can be supported. In this case, the UE may indicate:

2-a) The UE may use the MPTCP function with all steering modes to steer, switch and split the MPTCP traffic of the MA PDU session.

2-b) The UE may use the ATSSS-LL function with active-standby steering mode to steer, switch and split all other traffic (eg, non-MPTCP traffic) of the MA PDU session.

3) MPTCP functionality with any steering mode and ATSSS-LL functionality with any steering mode. In this case, the MPTCP function with all steering modes and the ATSSS-LL function with all steering modes may be supported. In this case, the UE may indicate:

3-a) The UE may use the MPTCP function with all steering modes to steer, switch and split the MPTCP traffic of the MA PDU session.

3-b) The UE can use the ATSSS-LL function with any steering mode to steer, switch and split all other traffic (i.e. non-MPTCP traffic) in the MA PDU session.

The steering function described above is schematically illustrated in FIG. 10, which shows an exemplary model for an ATSSS-capable UE supporting the MPTCP function and the ATSSS-LL function.

Figure 10:
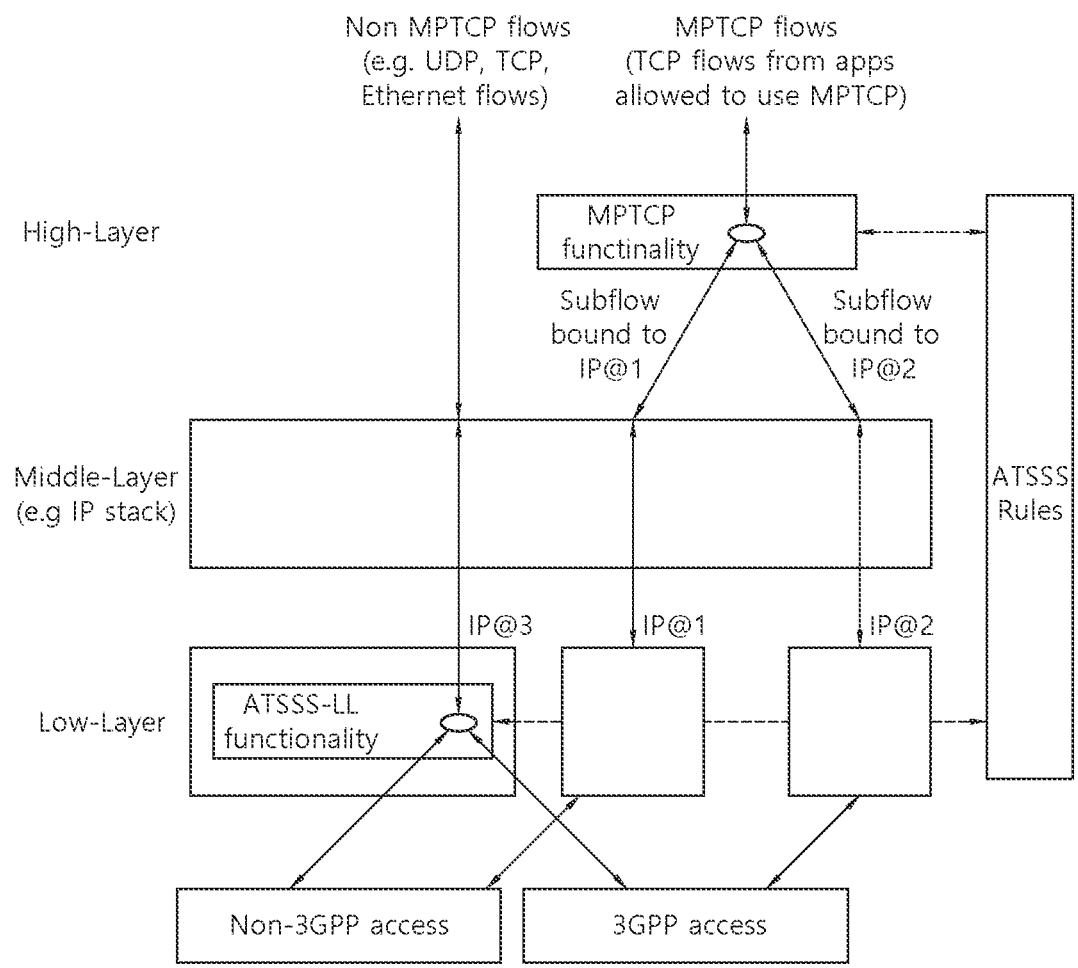
FIG. 10 is a diagram illustrating an example of a steering function of a UE.

FIG. 10 is a diagram illustrating an example of a steering function of a UE.

In the example of FIG. 10, MPTCP flow may indicate traffic of an application to which MPTCP can be applied. In the figure, three different IP addresses (eg, IP@1, IP@2, IP@3) are shown in the UE.

The "Low-Layer" in this figure may contain functions operating below the IP layer (eg other network interfaces of the UE), and the "High-Layer" may contain functions operating above the IP layer.

Within the same MA PDU session of the UE, the MPTCP function may be used to steer the MPTCP flow, and at the same time, the ATSSS-LL function may be used to steer all other flows. For the same packet flow, one steering function can be used.

All steering functions of the UE may use the same set of ATSSS rules to perform ATSSS decisions (eg, how to steer, switch, split traffic). Similarly, all ATSSS decisions in UPF can be performed by applying the same set of N4 rules supporting ATSSS. The ATSSS rule and the N4 rule supporting ATSSS may be provided to each of the UE and the UPF when the MA PDU session is established.

When the UE supports both MPTCP functionality and ATSSS-LL functionality, the UE may determine a steering function to be applied to a specific packet flow by using the provided ATSSS rule.

Hereinafter, the ATSSS rule will be described in detail.

After the MA PDU session is established, the UE may receive a priority list of ATSSS rules from the SMF. An example of the structure of the ATSSS rule is shown in Table 3 below.

TABLE 3

| Information name | Description | Category | SMF permitted to modify in a PDU context | Scope |
| --- | --- | --- | --- | --- |
| Rule Precedence | Determines the order in which the ATSSS rule is evaluated in the UE | Mandatory (NOTE 1) | Yes | PDU context |
| Traffic Descriptor | This part defines the traffic descriptor component of the ATSSS rule. | Mandatory (NOTE 2) | | |

TABLE 3-continued

| Information name | Description | Category | SMF permitted to modify in a PDU context | Scope |
|---|---|---|---|---|
| Application descriptors | Includes one or more application IDs that identify the application generating the traffic (NOTE 3). | Optional | Yes | PDU context |
| IP descriptors (NOTE 4) | One or more 5-tuples that identify the destination of IP traffic. | Optional | Yes | PDU context |
| Non-IP descriptors (NOTE 4) | Includes one or more descriptors to identify the destination of non-IP traffic, such as Ethernet traffic. | Optional | Yes | PDU context |
| Access Selection Descriptor | This part defines the Access Selection Descriptor components for the ATSSS rule. | Mandatory | | |
| Steering Mode | Identifies the steering mode that may be applied for the matching traffic. | Mandatory | Yes | PDU context |
| Steering Functionality | Identifies whether the MPTCP functionality or the ATSSS-LL functionality should be applied for the matching traffic. | Optional (NOTE 5) | Yes | PDU context |

In Table 3 above, NOTE1 to NOTE5 are as follows:
(NOTE 1):
Each ATSSS rule may have a different precedence value from the other ATSSS rules.
(NOTE 2):
There may be more than one traffic descriptor component.
(NOTE 3):
Application ID may include OSId(Operating System Id) and an OSAppId(Operating System Application Id).
(NOTE 4):
An ATSSS rule cannot contain both IP descriptors and Non-IP descriptors.
(NOTE 5):
If the UE supports only one Steering Functionality, this component is omitted.

The UE may evaluate the ATSSS rules according to priority order.

Each ATSSS rule may include a traffic descriptor (eg, including one or more components described in the example in Table 3) that may determine when the rule is applicable. When all components of the traffic descriptor match the considered service data flow (SDF), the ATSSS rule may be determined to be applicable.

Depending on the type of MA PDU session, the traffic descriptor may include components such as the following examples:
  When the type of the MA PDU session is IPv4, IPv6, or IPv4v6 type: The traffic descriptor may include an application descriptor and/or an IP descriptor.
  When the type of MA PDU session is Ethernet type: The traffic descriptor may include an application descriptor and/or a non-IP descriptor.

One ATSSS rule may be provided to the UE with a "match all" traffic descriptor that matches all SDFs. If this ATSSS rule is provided, this ATSSS rule may have the lowest Rule Precedence value. This ATSSS rule may be evaluated last by the UE.

Each ATSSS rule may include an access selection descriptor that includes components such as the following examples:
  ATSSS rules may include Steering Mode. Steering Mode may determine how the matched SDF should be distributed over 3GPP access and non-3GPP access. Steering Modes such as the following examples may be supported:
  1) Active-Standby: Active-Standby can be used to steer the SDF in one access (Active access) (if this access is available). And, when active access is unavailable, Active-Standby can be used to switch the SDF to another available access (Standby access). When active access becomes available again, the SDF can be switched back to active access. If standby access is not defined, SDF is allowed only for active access and cannot be transmitted to other accesses.
  2) Smallest Delay: Smallest Delay can be used to steer the SDF to the access determined to have the smallest Round-Trip Time (RTT). Measurements may be performed by the UE and UPF to determine RTT over 3GPP access and non-3GPP access. Also, if one access becomes unavailable, SDF traffic can be switched to another available access, if allowed by PCC rules.
  3) Load-Balancing: Load-Balancing can be used to split the SDF through both accesses when both accesses are available. Load-Balancing may include a percentage of SDF traffic transmitted through 3GPP access and non-3GPP access. Load-balancing can only be applied to non-GBR (Guaranteed Bit Rate) QoS flows. Also, if one access becomes unavailable, all SDF traffic may be switched to another available access, as if the percentage of SDF traffic over the other available access is 100%.
  4) Priority-based: Priority-based can be used to steer the traffic of SDF with high priority access. Priority-based can be used to steer the traffic of the SDF to high priority access until it is determined that the high priority access is congested. When it is determined that the high-priority access is congested, the traffic of the SDF may be transmitted even with the low-priority access. That is, SDF traffic may be split through two accesses. Also, if high priority access becomes unavailable, all SDF traffic may be switched through low priority access. How the UE and the UPF determine when congestion occurs in access may vary by implementation.

ATSSS rules may include Steering Functionality. Steering Functionality can be used to identify whether the MPTCP function or the ATSSS-LL function can be used to steer the traffic of the matching SDF. Steering Functionality can be used when the UE supports multiple functions for ATSSS.

Note that it is not necessary to update the ATSSS rules when one access becomes available or becomes unavailable.

An example of an ATSSS rule that may be provided to a UE is described as follows:

a) ATSSS rules may include "Traffic Descriptor: UDP, DestAddr 1.2.3.4" and "Steering Mode: Active-Standby, Active=3GPP, Standby=non-3GPP":

This ATSSS rule may mean "steers UDP traffic having a destination IP address 1.2.3.4 to active access (3GPP access) when active access (3GPP access) is available. If active access is unavailable, use standby access (non-3GPP access)".

b) ATSSS rules may include "Traffic Descriptor: TCP, DestPort 8080", and "Steering Mode: Smallest Delay":

This ATSSS rule may mean "steer TCP traffic with destination port 8080 to the access with the least delay". The UE may measure the RTT over both accesses to determine the access with the least delay.

c) ATSSS rules may include "Traffic Descriptor: Application-1" Steering Mode: Load-Balancing, 3GPP=20%, non-3GPP=80%", and "Steering Functionality: MPTCP":

This ATSSS rule may mean "Using the MPTCP function, transmit 20% of application-1's traffic over 3GPP access, and transmit 80% of application-1's traffic over non-3GPP access".

<ATSSS Procedure>

Hereinafter, procedures related to ATSSS will be described. For example, the procedure for enabling support of ATSSS is described. These procedures can only be applied by ATSSS-capable UEs and 5GC networks.

The MA PDU session may enable ATSSS. The traffic of the MA PDU session may be carried over 3GPP access or non-3GPP access or both 3GPP and non-3GPP access. With the available access of the MA PDU session, the manner in which traffic is transported can be managed by the available policies created by the 5GC network.

First, the UE requested MA PDU session establishment procedure will be described.

Figure 11B:
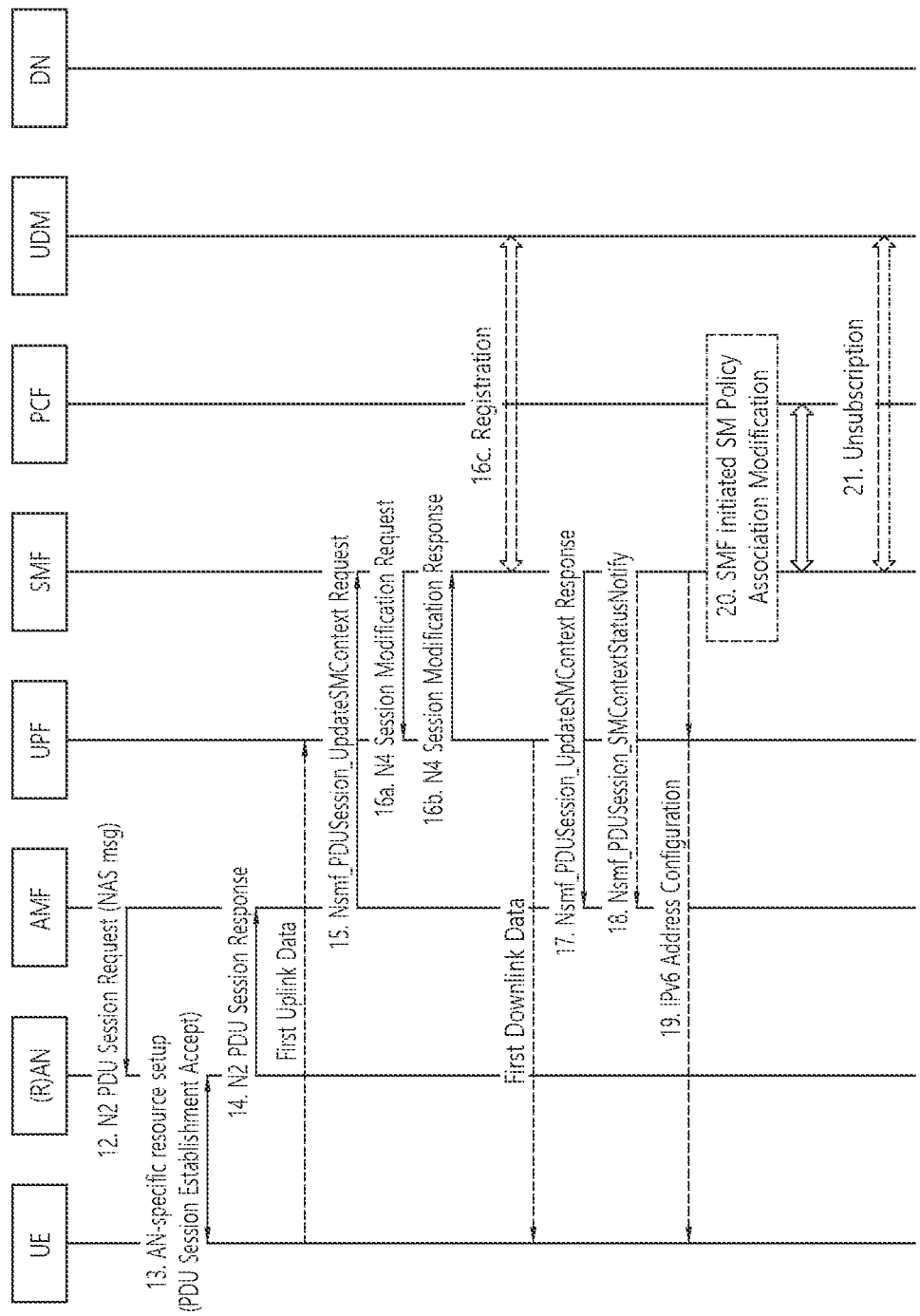

For example, the MA PDU session establishment procedure requested by the UE may be performed in the same manner as in the examples of FIGS. 11a and 11b. The PDU session establishment procedure shown in FIGS. 11a and 11b is similar to the PDU session establishment procedure shown in FIGS. 6a and 6b. Hereinafter, the differentiated parts will be mainly described.

FIGS. 11a and 11b are signal flow diagrams illustrating a PDU session establishment procedure.

For the PDU session establishment procedure shown in the example of FIGS. 11a and 11b, the following description may be applied:

A PDU session establishment request message may be transmitted through 3GPP access or non-3GPP access. In the steps described below, for convenience of description, it is assumed that the PDU session establishment request message is transmitted through 3GPP access.

In step 1), the UE may provide a NAS message (UL NAS Transport message) including the "MA PDU Request" indication, and may provide ATSSS function (eg, "MPTCP function" and/or "ATSSS-LL function") in the MA PDU session establishment request message.

Here, the "MA PDU Request" indication and Request Type="initial request" indicates that this PDU session establishment request may indicate to the network that the ATSSS-LL function or the MPTCP function or both functions are applied to establish a new MA PDU session and to steer the traffic of this MA PDU session.

If the UE requests S-NSSAI and the UE is registered through both accesses, the UE may request S-NSSAI allowed in both accesses.

In step 2), if AMF supports MA PDU session, AMF selects an SMF that supports MA PDU session.

In step 3), the AMF informs the SMF that the request is for the MA PDU session (eg, includes the "MA PDU Request" indication in the request message sent by the AMF to the SMF), and additionally the AMF informs the SMF that whether the UE has been registered through both accesses. If the AMF determines that the UE is registered through both accesses, but the requested S-NSSAI is not allowed in both accesses, the AMF may reject MA PDU session establishment.

In step 4), upon receiving the PDU session establishment request message, the SMF may know that the UE has requested the MA PDU session based on the indication. The SMF may retrieve whether the MA PDU session is allowed through session management subscription data.

In step 7), if the dynamic PCC is used for the MA PDU session, the SMF may transmit the Policy Control Create message including the "MA PDU Request" indication and ATSSS capability information to the PCF. The PCF may determine whether the MA PDU session is allowed or not based on the operator policy and subscription data, and may provide an ATSSS Steering policy.

The PCF may provide a PCC rule (eg, a PCC rule including ATSSS policy control information) for the MA PDU session to the SMF. From the received PCC rule, the SMF may derive (a) an ATSSS rule transmitted to the UE to control traffic steering, switching, and splitting in the uplink direction, and (b) an N4 rule sent to the UPF to control traffic steering, switching, and splitting in the downlink direction. When the UE indicates "ATSSS-LL Capability" support, the SMF may derive Measurement Assistance Information.

If the SMF receives a UP security policy for a PDU session with Integrity Protection set to "Required", and the MA PDU session is established via non-3GPP access, the SMF may not verify whether the access can meet the UP security policy.

The SMF may establish a user-plane resource through the access through which the PDU session request message is transmitted (eg, 3GPP access).

In step 10), the N4 rule for the MA PDU session derived by the SMF may be transmitted to the UPF. In addition, two pieces of N3 UL CN tunnel information may be allocated by SMF or UPF. If the ATSSS capability for the MA PDU session indicates "ATSSS-LL Capability", the SMF may include information for measurement in the N4 rule to indicate that the UPF initiates measurement for this MA PDU session. In step 10a), the UPF may allocate addressing information for the UPF to a Performance Measurement Function (PMF) within the UPF. In step 10b), the UPF may transmit address information for the PMF of the UPF to the SMF.

In step 11, when the SMF allows the establishment of the MA PDU session, the SMF may deliver a PDU session establishment accept message. For example, for the MA PDU session, the SMF may transmit a Namf_Communication_NIN2MessageTransfer message including the "MA PDU session Accepted" indication to the AMF. And, the SMF may inform the AMF that the N2 SM information included in this message should be transmitted through 3GPP access. The AMF may mark this PDU session as an MA PDU session based on the received "MA PDU session Accepted" indication.

In step 13), the UE may receive a PDU Session Establishment Accept message informing the UE that the requested MA PDU session has been successfully established. This message may include ATSSS rules for the MA PDU session derived by the SMF. When the ATSSS function for the MA PDU session indicates "ATSSS-LL function", the SMF may include addressing information of the PMF in the UPF in the measurement support information.

If the SMF is notified in step 2) that the UE is registered through both accesses, after step 18) is performed, the SMF may also initiate establishment of user plane resources through non-3GPP access. The SMF may transmit an N1N2 Message Transfer message including the N2 SM information to the AMF, and inform the AMF that the N2 SM information should be transmitted through non-3GPP access. Since the N1 SM container for the UE was sent to the UE in step 13), the N1N2 Message Transfer message may not include the N1 SM container for the UE. After step 18) is performed, two N3 tunnels between the PSA and the RAN/AN may be established.

The last step above may not be performed if the UE is registered through only one access (when MA PDU session is established with user-plane resources through one access).

Hereinafter, the UE or network requested MA PDU session modification procedure will be described.

Figure 12A:
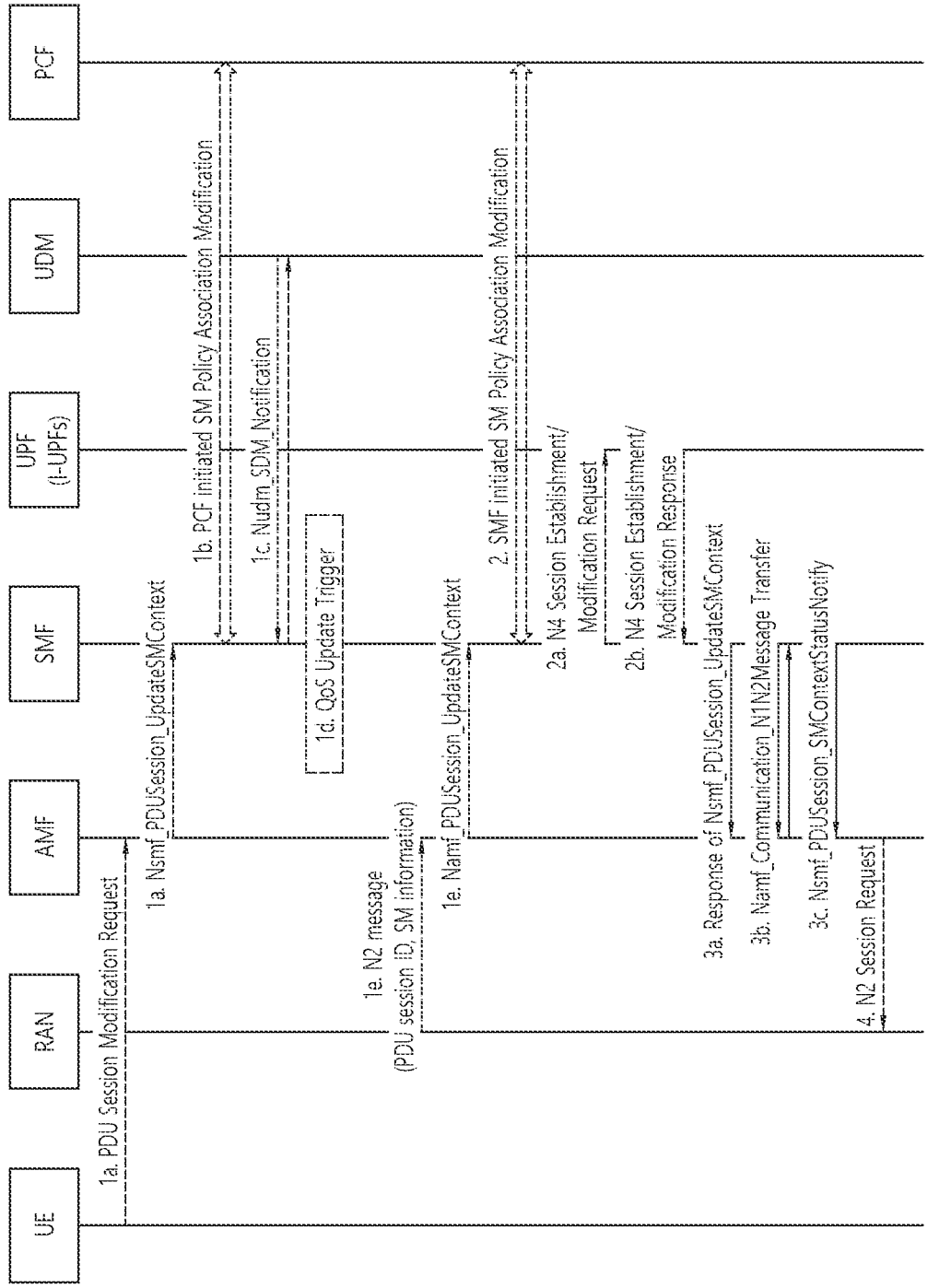
FIGS. 12a and 12b show a PDU session modification procedure.
Figure 12B:
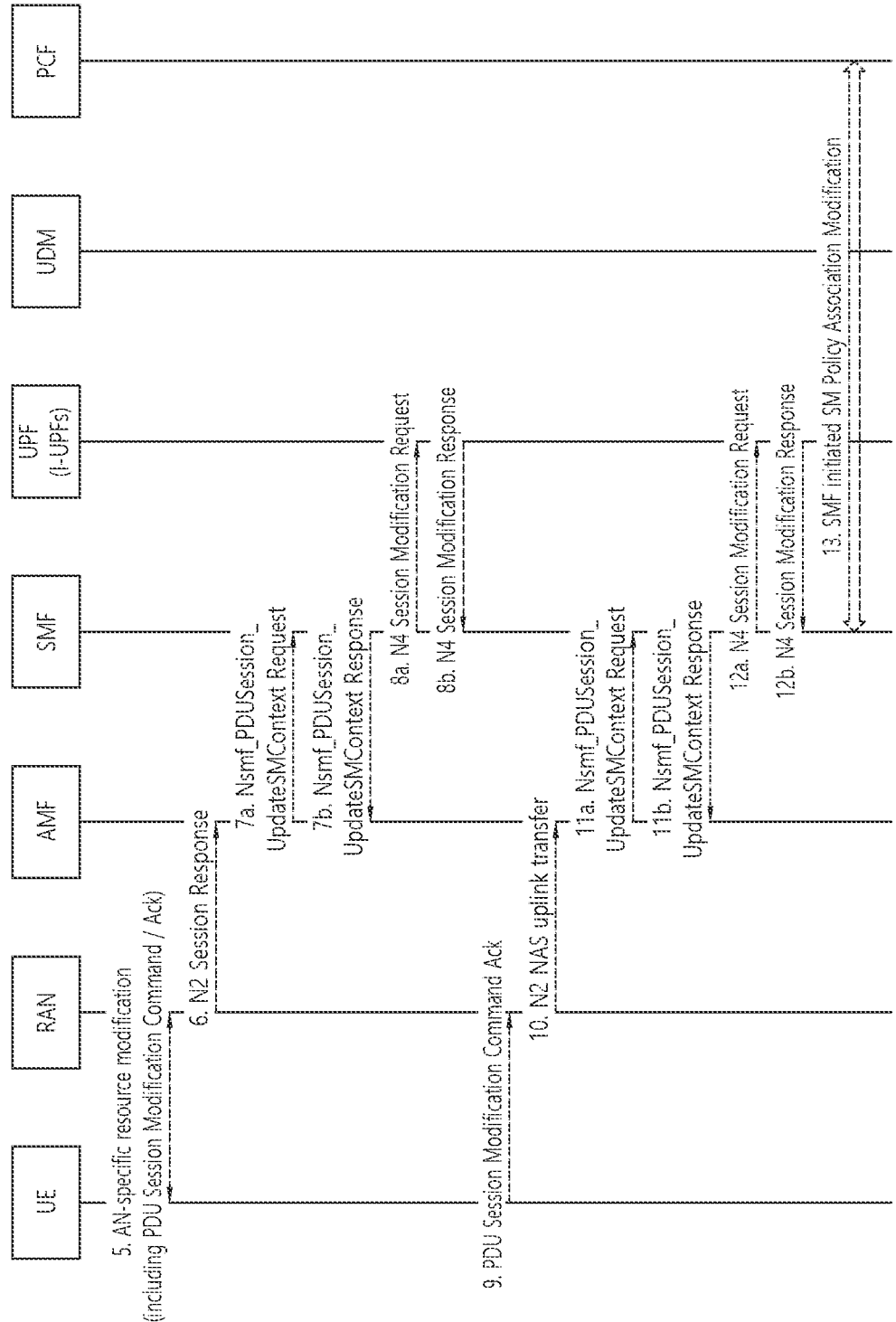

For example, the MA PDU session modification procedure requested by the UE or the network may be performed in the same manner as in the examples of FIGS. 12a and 12b. The PDU session modification procedure shown in FIGS. 12a and 12b is similar to the PDU session modification procedure shown in FIGS. 7a and 7b. Hereinafter, the differentiated parts will be mainly described.

FIGS. 12a and 12b show a PDU session modification procedure.

The PDU session modification procedure of the MA PDU session may be triggered in the following examples:
QoS flow generation/modification (including movement of GBR QoS flows).
Update of ATSSS rules and/or N4 rules The MA PDU session may be established/managed based on the PDU session modification procedure.

The PDU session modification procedure may be initiated by the UE or may be initiated by the network.

In step 1b), the SMF may receive the updated PCC rule from the PCF. SMF may decide to update ATSSS rules and/or N4 rules based on the updated PCC rules.

In step 1d), when the UPF determines that GBR traffic cannot be transmitted through current ongoing access (eg, determined based on N4 rules and access availability reporting and access non-availability reporting from the UE), the UPF may transmit an access availability report to the SMF. When the SMF receives the access availability report, the SMF may decide to move the GBR QoS flow to another access. If the SMF decides to move the GBR QoS flow, the SMF may trigger this procedure and later move the GBR QoS flow to the target access.

When the SMF decides to move the GBR QoS Flow to another access, in step 3), the SMF may transmit N2 SM information to the target AN. In order for the UE to transmit uplink GBR traffic through the target access, a PDU session modification command message may be transmitted to the UE to update the UE's ATSSS rules. The SMF may release the AN resource of the GBR QoS flow in source access.

In step 3), if the SMF establishes the user plane for the QoS flow, the SMF may provide the AN with a QoS profile as in the following example:

i) In the case of Non-GBR QoS Flow, steps 3) to 8) may be performed for each access for which the user plane resource is activated.

ii) In the case of a GBR QoS Flow allowed in single access, steps 3) to 8) may be performed in allowed access.

iii) In the case of a GBR QoS Flow allowed in both accesses, steps 3) to 8) may be performed in the access according to the decision of the SMF.

In step 3), when the SMF wants to update the ATSSS rule, the SMF may include the updated ATSSS rule in the N1 SM container (including the PDU session modification command). When the SMF provides the N1 SM container and/or N2 SM information, the SMF may include an access type in the Namf_Communication_N1N2MessageTransfer message to provide routing information to the AMF.

In step 8), if the SMF decides to move the GBR QoS Flow to another access, the SMF may send the updated N4 rule to the UPF.

<N4 Session Management>

N4 session management is described.

There are parameters for N4 session management. The SMF can use these parameters to control the function of the UPF. The UPF can use these parameters to notify the SMF of an event occurring in the UPF.

The N4 session management procedure may use related parameters in the same way for all N4 reference points. For example, the N4 session establishment procedure and the N4 session modification procedure may provide control parameters to the UPF. The N4 session release procedure may remove all control parameters related to the N4 session. The N4 Session Level Reporting procedure may inform the SMF about an event related to a PDU session detected by the UPF.

The parameters that the SM provides to the UPF through the N4 reference point may include the N4 session ID and information such as the following example:

Packet Detection Rules (PDR) including information to classify traffic (PDU(s)) arriving at the UPF For the traffic identified by the PDR, Forwarding Action Rules (FAR) including information on whether forwarding, dropping or buffering will be applied Multi-Access Rules (MAR) including information on how to handle traffic steering, switching and segmentation for MA PDU sessions Usage Reporting Rules (URR). Usage reporting rules may include information defining how to account for traffic identified by the PDR and how to report specific measurements. When QoS monitoring is enabled for the traffic identified by the PDR(s), the URR may also include information defining how to measure the packet delay of the traffic and how to report the measurement result.

QoS Enforcement Rules (QER) including information related to QoS enforcement of traffic identified by the PDR(s).

Trace Requirements.

Port Management Information Container of 5GS.

Bridge Information.

N4 Session ID can be allocated by SMF. The N4 session ID may uniquely identify the N4 session.

If the UPF has indicated support for Trace, the SMF may activate the trace session during the N4 session establishment procedure or the N4 session modification procedure. In this case, the SMF may provide trace requirements to the UPF. SMF can use the N4 session modification procedure to disable trace sessions in progress. There can be at most one active trace session per N4 session at a time.

For MA PDU session, for traffic steering in UPF, SMF updates MAR (Multi-Access Rule) by adding FAR ID referring to FAR (Forward Action Rule) including additional access tunnel information for MA PDU session, such that additional access tunnel information can be added during the N4 session modification procedure. For MA PDU sessions, the SMF may request the UPF to report access availability per N4 session.

The N4 session can be used to control both UPF and Network-Side Time-Sensitive Networking (TSN) Translator (NW-TT) operations in UPF. The N4 session may support and activate the exchange of TSN bridge settings between SMF and UPF. The N4 session may use the following information:

information that the SMF needs bridge management;
Information that 5GS transparently relays between AF and NW-TT: Transparent Port Management Information Container.

When the N4 session related to bridge management is established, the UPF may allocate a dedicated port number to the Device-Side TT (DS-TT) side of the PDU session. The UPF may provide the SMF with the following configuration parameters for the N4 session:

NW-TT port number;
DS-TT port number.

After the N4 session is established, the SMF and UPF can exchange transparent bridge port management information containers at any time through the N4 session.

The N4 session context is described. An N4 session context may be identified by an N4 session ID. In order to store parameters related to an N4 session, an N4 session context may be generated by SMF and UPF, respectively. For example, parameters related to an N4 session may include the N4 session ID used for this N4 session, all PDRs, URRs, QERs and FARs or MARs.

Hereinafter, Packet Detection Rule (PDR) will be described.

The PDR may include information for classifying traffic (PDU(s)) arriving at the UPF. Table 4 below is an example of a PDR. All PDRs can be used to detect packets in a specific transmission direction (eg, UL direction or DL direction). An example of the PDR described in Table 4 may indicate attributes in the PDR.

TABLE 4

| Attribute | | Description | Comment |
|---|---|---|---|
| N4 Session ID | | The N4 session associated with this PDR can be identified. (NOTE 5) | |
| Rule ID | | A unique identifier to identify this rule | |
| Precedence | | Determines the order in which the detection information of all rules is applied. | |
| Packet Detection Information. (NOTE 4) | Source interface | includes information such as "access side", "core side", "SMF", "N6-LAN", "5G VN(Virtual Network) internal", etc. | A combination of UE IP address (along with network instance if necessary). CN tunnel information, packet filter set, application ID, Ethernet PDU session information, QoS monitoring packet indicator and QFI can be used for traffic detection. The source interface may identify an interface for incoming packets to which the PDR is applied. For example, incoming packets subject to PDR can be either access side (eg uplink), core side (eg downlink), SMF, N6-LAN (eg DN or local DN) or "inside 5G VN" (eg. : can be received from the local switch). |
| | UE IP address | One IPv4 address and or one IPv6 prefix with prefix length (NOTE 3). | |
| | Network instance (NOTE 1) | Identifies the network instance associated with the incoming packet. | |
| | CN tunnel info | It means CN tunnel information for N3 interface and N9 interface. For example, the CN tunnel information may be a Fully qualified-Tunnel Endpoint Identifier (F-TEID). | |
| | Packet Filter Set | It means a set of packet filters. | |
| | Application ID | It means the ID of the application. | |
| | QoS Flow ID | Including values of 5QI or non-standardized QFI. | |
| | Ethernet PDU Session Information | Refers to all (DL) Ethernet packets matching the Ethernet pdu session. | |
| | Framed Route Information | Means Framed Route information. | |
| | QoS Monitoring Packet indicator (NOTE 8) | Identifies packets used for QoS monitoring. | |

TABLE 4-continued

| Attribute | | Description | Comment |
|---|---|---|---|
| Packet replication and detection carry on information (NOTE 6) | Packet replication skip information (NOTE 7) | Includes UE address indication or N19/N6 indication. If the packet matches packet replication skip information, that is, if the source address of the packet is the UE address or the packet is received at the interface of the packet replication skip information, the UP function does not create a copy of the packet or does not apply the corresponding processing (eg FAR, QER, URR). Otherwise, the UPF performs a copy and applies the corresponding process (eg FAR, QER, URR). | |
| | Carry on indication | It can instruct the UP function to continue the packet detection process, that is, lookup other PDRs without higher precedence. | |
| Outer header removal | | It can instruct the UP function to remove one or more external headers (eg IP + UDP + GTP, IP + possibly UDP, VLAN tags) from the received packet. | An extended header may be stored for this packet. |
| Forwarding Action Rule ID (NOTE 2) | | A Forwarding Action Rule ID may identify a forwarding action to be applied. | |
| Multi-Access Rule ID (NOTE 2) | | Multi-Access Rule ID (Multi-Access Rule ID) identifies the action to be applied to forward processing for MA PDU sessions. | |
| List of Usage Reporting Rule ID(s) | | Every Usage Reporting Rule ID can identify which measurement action needs to be applied. | |
| List of QoS Enforcement Rule ID(s) | | Every QoS Enforcement Rule ID (QoS Enforcement Rule ID) identifies a QoS enforcement action to be applied. | |

In the example of Table 4, NOTE 1 to NOTE 8 mean the following.
(NOTE 1):
It may be necessary, for example, in the following cases:
If the UPF supports multiple DNNs with overlapping IP addresses
When the UPF is connected to another UPF or AN node in a different IP domain
For UPF "local switch", N6-based forwarding and N19 forwarding can be used for different 5G LAN groups.
(NOTE 2):
Either FAR ID or MAR ID may be included. Not all FAR IDs and MAR IDs are included.
(NOTE 3):
The SMF may provide an indication to request that the UPF allocate one IPv4 address and/or an IPv6 prefix. When requesting to provide an IPv6 prefix, the SMF may also provide the IPv6 prefix length.
(NOTE 4):
When SMF sends PDR to I-SMF via N16a, Packet Detection Information may indicate that I-SMF will determine CN tunnel information locally to build N4 PDR. Here, the N4 PDR may be transmitted to the actual UPF controlled by the I-SMF.
(NOTE 5):
Rules exchanged between I-SMF and SMF are not associated with N4 session ID but may be associated with N16a association.
(NOTE 6):
This may be necessary when supporting broadcast/multicast traffic forwarding using packet replication with SME-provided PDRs and FARs.
(NOTE 7):
To prevent UPF from sending broadcast/multicast packets back to the source UE or source N19/N6, this may be necessary if packet replication using SMF-provided PDR and FAR is performed.
(NOTE 8):
The UPF may identify a UL packet or a dummy packet to be a QoS monitoring packet based on the QoS monitoring packet indicator encapsulated in the GTP-U header by the NG-RAN.

Hereinafter, QoS Enforcement Rule (QER) will be described.

QER may define a packet processing method in terms of bit rate limitation and packet marking for QoS purposes. An example of Table 5 below is an example of QER. For reference, all PDRs referencing the same QER may share the same QoS resource (eg, Maximum Flow Bit Rate (MFBR)). Examples of QERs listed in Table 5 may indicate attributes in the QER.

TABLE 5

| Attribute | Description | Comment |
|---|---|---|
| N4 Session ID | Identifies the N4 session associated to this QER | |
| Rule ID | Unique identifier to identify this information. | |
| QoS Enforcement Rule correlation ID (NOTE 1) | The QER correlation ID is an ID that allows the UP function to correlate multiple sessions for the same UE and APN. | QER correlation ID may be used to associate QER for APN-AMBR(Access Point Name-Aggregate Maximum Bit Rate). |

TABLE 5-continued

| Attribute | Description | Comment |
| --- | --- | --- |
| Gate status UL/DL | Gate status UL/DL may instruct the UP function (UPF) to pass or block the flow. | Values that Gate status UL/DL may include are: open, close, close after measurement report (for termination action "discard") |
| Maximum bitrate | Maximum bitrate may be an uplink/downlink maximum bitrate to enforce on the packet. | The Maximum bitrate field may contain one of the following examples: APN-AMBR (for QER referenced by all PDRs involved in all PUN connections to APN) (NOTE 1). Session-AMBR (for QERs referenced by all relevant PDRs of the PDU session). QoS Flow MBR (in case of QER referenced by all PDRs of QoS Flow) SDF MBR (for a QER that is referenced by the uplink/downlink Packet Detection Rule of a SDF) Bearer MBR (for a QER that is referenced by all relevant Packet Detection Rules of a bearer) (NOTE 1). |
| Guaranteed bitrate | It means the uplink/downlink guaranteed bit rate approved for the packet. | The Guaranteed bitrate field may include the following examples: QoS Flow GBR (for a QER that is referenced by all Packet Detection Rules of a QoS Flow) Bearer GBR (for a QER that is referenced by all relevant Packet Detection Rules of a bearer) (NOTE 1). |
| Averaging window | The averaging window may mean a time duration during which the maximum and guaranteed bit rates are calculated. | The averaging window can be used to count packets received over a period of time. |
| Down-link flow level marking | Down-link flow level marking may refer to flow level packet marking in downlink. | In the case of UPF, down-link flow level marking can be used to control the Reflective QoS Indicator (RQI) setting of the encapsulation header. |
| QoS Flow ID | It means QoS Flow ID to be inserted by UPF. | UPF may insert a QFI value in the tunnel header of the outgoing packet. |
| Paging Policy Indicator | Indicates the Paging Policy Indicator (PPI) value required for UPF to insert into outgoing packets. | PPI can only be applied to DL traffic. The UPF may insert the PPI into an outer header of the outgoing PDU. |
| Packet rate (NOTE 1) | It may mean the number of packets per time interval to be enforced. | The Packet rate field may contain one of the following: downlink packet rate for Serving PLMN Rate Control (When the QER is referenced by all PDRs of the UE belonging to a PDN connection using Cellular IoT (CIoT) EPS optimization.) uplink/downlink packet rate for APN Rate Control (When the QER is referenced by all PDRs of the UE belonging to the PDN connection to the same APN using CIoT EPS optimization.). |

In the example of Table 5, NOTE 1 means:
(NOTE 1):
This parameter can only be used for interworking with EPC.

Hereinafter, the Multi-Access Rule (MAR) will be described.

MAR may be a rule applied when using ATSSS. The MAR may include information related to a Forwarding Action Rule (FAR) used for each access. For example, when ATSSS is supported, the MAR may include information on association of two FARs for both 3GPP access and non-3GPP access. Table 6 below is an example of MAR. An example of the MAR described in Table 6 may indicate attributes in the PDR.

TABLE 6

| Attribute | | Description | Comment |
|---|---|---|---|
| N4 Session ID | | Identifies the N4 session associated to this MAR. | |
| Rule ID | | Unique identifier to identify this rule. | |
| Steering functionality | | Applicable traffic steering function may be indicated: Steering functionality may include a value of "MPTCP functionality" and/or "ATSSS-LL functionality". | |
| Steering mode | | Steering mode may include the values "Active-Standby". "Smallest Delay", "Load Balancing" or "Priority-based". | |
| Per-Access Forwarding Action information (NOTE 1) | Forwarding Action Rule ID | The Forwarding Action Rule ID may identify forwarding action to be applied. | |
| | Weight | If the steering mode is "Load Balancing", the weight for the FAR can be identified. | The sum of weights for all FARs may be 100. |
| | Priority | Priority may include a value "Active or Standby" or "High or Low" for FAR. | "Active or Standby" may mean "Active-Standby" steering mode, and "High or Low" may mean "Priority-based" steering |
| | List of Usage Reporting Rule ID(s) | Every Usage Reporting Rule ID can identify which measurement action should be applied. | List of Usage Reporting Rule ID(s) may cause the SMF to request separate usage reports for different FARs (eg, different accesses). |

In the example of Table 6, NOTE 1 may mean the following.
(NOTE 1):
Per-Access Forwarding Action information may be provided for each access type (eg, 3GPP access or non-3GPP access).

40   Hereinafter, a Forwarding Action Rule (FAR) will be described.

FAR may define how to buffer, drop, or forward packets. The FAR may include information related to packet encapsulation and/or packet decapsulation and forwarding destination. Examples of the FAR described in Table 7 may indicate the attributes in the PDR.

TABLE 7

| Attribute | Description | Comment |
|---|---|---|
| N4 Session ID | It is possible to identify the N4 session associated with this FAR. | NOTE 9. |
| Rule ID | A unique identifier that identifies this rule. | |
| Action | Identifies the action to be applied to the packet. | May indicate whether a packet is forwarded, duplicated, dropped, or buffered. A number of additional attributes may be included in the FAR if the operation represents forwarding or replication. In the case of a buffering action, the Buffer Action Rule is also included, and the action may also indicate that notification of the first buffered packet and/or notification |

TABLE 7-continued

| Attribute | Description | Comment |
|---|---|---|
| Network instance (NOTE 2) | A network instance associated with an outgoing packet may be identified (NOTE 1). | of the first discarded packet is requested. NOTE 8. |
| Destination interface (NOTE 3) (NOTE 7) | May include the values "access side", "core side", "SMF", "N6-LAN", "5G VN internal" or "5G VN N19". | Access side (i.e. downlink). core side (i.e. uplink), SMF, N6-LAN (i.e. the DN or the local DN), 5G VN internal (i.e. local switch), Alternatively, an interface for outgoing packets to 5G VN N19 (i.e. N19 interface) may be identified. |
| Outer header creation (NOTE 3) | Instructs the UP function to add an external header (eg IP + UDP + GTP, VLAN tag). IP + possibly UDP to the outgoing packet. | May include ON tunnel information of a peer entity (eg, NG-RAN, another UPF, SMF, local access to a DN indicated by DNAI), N6 tunnel information, or AN tunnel information of a peer entity. A stored extension header may be added to this packet. When QoS monitoring is activated for traffic corresponding to PDR (s). a time stamp may be added to the GTP-U header. |
| Send end marker packet(s) (NOTE 2) | Instructs the UPF to construct end marker packet(s) and send them out as described in clause 5.8.1. instructs the UPF to construct an end marker packet(s) and to transmit it. | This parameter should be sent together with the "outer header creation" parameter of the new CN tunnel info. |
| Transport level marking (NOTE 3) | It may refer to transport level packet marking of uplink and downlink. For example, the DiffServ Code Point can be configured. | NOTE 8. |
| Forwarding policy (NOTE 3) | It may be a reference to a preset traffic steering policy or http redirection (NOTE 4). | It may contain one of the following policies identified by the TSP ID: an N6-LAN steering policy that steers subscriber's traffic to the appropriate N6 service function deployed by the operator: or a local N6 steering policy that enables traffic steering in local access to the DN according to the routing information provided by the AF, or Redirect Destination and value for forwarding action (always, after measurement report (may be done to terminate action "redirect"). |
| Request for Proxying in UPF | It may indicate that the UPF performs ARP proxying and/or IPv6 Neighbor Solicitation Proxying. | It can be applied to Ethernet PDU Session type. |
| Container for header enrichment (NOTE 2) | It may include information used by UPF for header enrichment. | It may be related only to the uplink direction. |
| Buffering Action Rule (NOTE 5) | It may be a reference to the Buffering Action Rule ID that defines the buffering instructions applied by the UPF. (NOTE 6). | |

In the example of Table 6, NOTE 1 to NOTE 9 may mean the following.
(NOTE 1):
This may be necessary in cases such as the following examples:
If the UPF supports multiple DNNs with overlapping IP addresses;

TABLE 7-continued

| Attribute | Description | Comment |
|---|---|---|

When the UPF is connected to another UPF or NG-RAN node in a different IP domain;
When UPF "local switch" and N19 forwarding are used for different 5G LAN groups;
(NOTE 2):
These attributes may be required to set the FAR action to forwarding.
(NOTE 3):
These attributes may be required to set the FAR action to forwarding or duplicating.
(NOTE 4):
TSP ID may be preset in SMF, and TSP ID may be included in FAR for N6-LAN steering or local N6 steering. TSP ID actions can be executed before Outer header creation actions.
(NOTE 5):
This attribute may exist for FAR operation set to buffering.
(NOTE 6):
The buffering action rale is generated by the SMF to apply a specific buffering action to the buffering-requested DL packet, and the buffering action rule can be associated with the FAR.
(NOTE 7):
The use of "5G VN internal" instructs the UPF to resend packets for another round of ingress processing by using active PDR belonging to another N4 session in the same 5G VN group.
NOTE 8:
FAR can be transmitted from SMF to I-SMF through N16a. A FAR sent by SMF may indicate that the I-SMF must determine the value of this attribute locally in order to build an N4 FAR rale that is sent to the actual UPF (controlled by the I-SMF).
NOTE 9:
Rules exchanged between I-SMF and SMF are not associated with N4 session IDs, but may be associated with N16a associations.

II. Problems to be Solved in the Disclosure of this Specification

In 5G mobile communication, the 3GPP Data Off function may be used. Discussion is ongoing that 3GPP Data Off should be supported even for MA PDU sessions. However, conventionally, when 3GPP Data Off is used for the MA PDU session, a method for supporting efficient communication has not been discussed.

Hereinafter, examples of problems to be solved in the disclosure of the present specification will be described.

For the MA PDU session, there was a discussion on whether to support PS Data Off. The following were discussed: The 3GPP PS Data Off feature can be applied only to the 3GPP access side of the MA PDU session. If 3GPP PS Data Off is activated for a UE with a MA PDU session, uplink traffic and downlink traffic for the MA PDU session through non-3GPP access may continue to follow the intended ATSSS rule.

That is, when the 3GPP PS Data Off function is used for the MA PDU Session, PS Data Off may be applied to 3GPP access and PS Data Off may not be applied to non-3GPP access. However, in this case, there is no discussion on how to enable "applying PS Data Off for 3GPP access and not applying PS Data Off for non-3GPP access".

For example, according to the prior art, when PS Data Off is activated, the following operation may be performed. When PS Data Off is activated, the PCF can block a service for a non-exemption service (ie, a service not included in the exempt service) using the following method.

For example, when PS Data Off is activated, the PCF may update the PCC rule so that data/traffic is discarded except for the exempt service. An example of a specific PCF operation is as follows.

When the PCF knows the activation of 3GPP PS Data Off, the PCF may update the PCC rule so that only packets for services belonging to the list of 3GPP PS Data Off Exempt Services are delivered, and all other packets are discarded.

For example, if the services are controlled by dynamic PCC rules, the PCF may modify the PCC rules to prevent the services from which the SMF and/or UPF do not belong to the list of PS Data Off Exempt Services. As an example, the PCF may modify the PCC rule by setting the gate status to "closed" in all dynamic PCC rules for the downlink direction and the uplink direction (selectively for the uplink direction). Alternatively, the PCF may remove these dynamic PCC rules. As another example, when services are controlled by predefined PCC rules (dynamic PCC rules), the PCF may deactivate these predefined PCC rules. The PCC rule with wild-carded service data flow filters can be one of the PCC rules that is modified, removed, or deactivated. In this case, the PCF may simultaneously install or enable PCC rules for 3GPP PS Data Off Exempt Services.

For example, for one PDU session, four PCC rules (eg, PCC rules A, B, C, D) may be activated. Here, PCC rule A may indicate 3GPP PS Data Off Exempt Service. In this case, if 3GPP PS Data Off is activated, the PCF may modify, or delete/deactivate PCC rules B, C and D. For example, if PCC rules B, C, and D are dynamic PCC rules, PCF modifies PCC rules B, C, and D by closing gates in the downlink direction and in the uplink direction (selectively for the uplink direction) (e.g. by setting the gate status to "closed" within a dynamic PCC rule). For example, if PCC rules B, C and D are predefined PCC rules, the PCF may remove or deactivate PCC rules B, C and D. Since PCC Rule A indicates 3GPP PS Data Off Exempt Service, PCC Rule A does not need to be changed. Assuming a situation in which PCC Rule B contains a wildcard service data flow filter with some 3GPP PS Data Off Exempt Service enabled, to enable downlink traffic and optionally uplink traffic for 3GPP PS Data Off Exempt Service, the PCF may install additional PCC rule E or activate PCC rule E.

According to the above description, the PCF may update the PCC rule. For example, by setting the gate status to "closed" in the PCC rule, the non-PS Data Off Exempted service is prevented (ie, the PCF performs gate control). The PCF may deliver the updated PCC rule to the SMF. The SMF may update the Packet Detection Rule (PDR) based on the updated PCC rule in the N4 Modification procedure. The SMF may perform gate control for a non-PS Data Off Exempted service (eg, a service not included in the PS Data Off Exempt service) based on the updated PDR. This operation may be performed by setting the gate status UL/DL of the QoS Enforcement Rule (QER) belonging to the SMF to the PDR to "close".

In case of MA PDU Session, one QER is included in one PDR. That is, QER can be equally applied regardless of access. In other words, one QER may be equally applied for both 3GPP access and non-3GPP access of the MA PDU session. If the PCF sets the gate status in the PCC rule to "closed" according to the prior art, gate control may be applied to both 3GPP access and non-3GPP access of the MA PDU Session. Then, there is a problem that the non-PS Data Off Exempted service (eg, a service not included in the PS Data Off Exempt service) cannot be serviced through 3GPP access as well as non-3GPP access. Even if communication is performed through non-3GPP access, even though there is no problem such as being charged additionally to the user, there is a problem that a non-PS Data Off Exempted service (eg, a service not included in the PS Data Off Exempt service) cannot be serviced even through non-3GPP access.

III. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

In the disclosure of this specification, a method for efficiently supporting 3GPP PS Data Off for a MA PDU session is proposed.

In an embodiment according to the disclosure of the present specification, the PCF may use the PCC rule. For example, the PCF may use an ATSSS rule without setting a gate control.

For MA PDU Session, the UE may activate PS Data Off. In this case, the PCF may not change the gate status when generating (or updating) the PCC rule. Instead, the PCF uses the ATSSS rule, depending on whether a specific service belongs to the PS Data Off Exempt service, the PCF may control through which access (3GPP access and/or non-3GPP access) data associated with a particular service can be transmitted.

For example, in the case of a service belonging to the PS Data Off Exempt service, since both 3GPP access and non-3GPP access can be used, the previously used ATSSS rule for the corresponding services does not need to be updated. On the other hand, in the case of a service belonging to the non-PS Data Off Exempted service (ie, a service not belonging to the PS Data Off Exempt service), it must be transmitted only through non-3GPP access. Therefore, the PCF may set the steering mode included in the PCC rule for the corresponding service (eg, service belonging to the non-PS Data Off Exempted service) to Active-Standby. In addition, the PCF may set Active access to "non-3GPP" in Active-Standby and may not set Standby access. PCF configured Active access to "non-3GPP" and did not configure Standby access, data related to a service belonging to the non-PS Data Off Exempted service (ie, a service not belonging to the PS Data Off Exempt service) may be delivered only through non-3GPP access.

The PCF may transmit the set PCC rule to the SMF. Then, the SMF may update the PDR according to the N4 Session Modification procedure. In addition, the SMF may transmit an updated ATSSS rule to the terminal.

In this case, all data related to services belonging to the non-PS Data Off Exempted service may be transmitted through non-3GPP access. And, even when non-3GPP access becomes unavailable (eg, when the UE goes out of WLAN coverage, etc.), according to the ATSSS rule, data related to services belonging to the non-PS Data Off Exempted service are not transmitted with 3GPP access. This is because the PCF sets Active access to "non-3GPP" and does not set Standby access.

According to the disclosure of this specification, in the case of a MA PDU session, PS Data Off status may not affect data transmission through non-3GPP access. When the PCF is notified of the activation of 3GPP PS Data Off for the MA PDU session, the PCF may update the PCC rules, such that packets for services not belonging to the list of 3GPP PS Data Off Exempt Services are delivered only through non-3GPP access.

According to the disclosure of this specification, in the case of an MA PDU session, to prevent SMF/UPF from transmitting data related to services that do not belong to the list of 3GPP PS Data Off Exempted Services through 3GPP access, if the service is controlled by dynamic PCC rules, the PCF may modify (or update) the PCC rules. For example, instead of modifying the gate status to "closed", the PCF may set Steering Mode to "Active-Standby" ("Active-Standby" where non-3GPP access is active access and there is no standby access for downlink direction and uplink direction).

According to the disclosure of this specification, in the case of an MA PDU session, all services belonging to the list of 3GPP PS Data Off Exempt Services can be represented by PCC rules that allow traffic to pass through. And, in all other PCC rules (PCC rules for services that do not belong to the list of 3GPP PS Data Off Exempt Services), steering Mode may be "Active-Standby" (non-3GPP access is active access and "Active-Standby" without standby access for downlink direction and uplink direction).

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
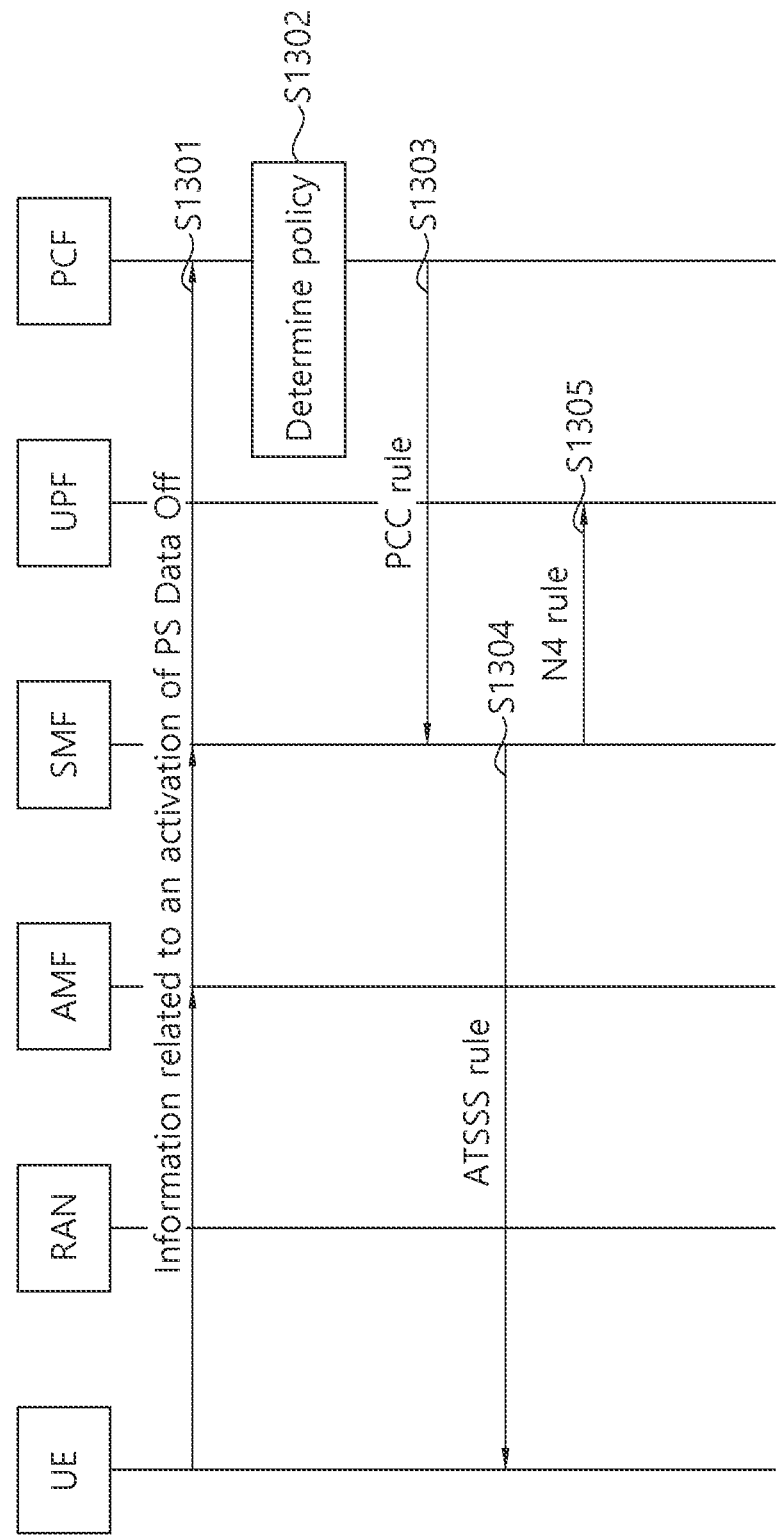
FIG. 13 shows an example of operation of a network and/or a terminal according to the disclosure of the present specification.

FIG. 13 shows an example of operation of a network and/or a terminal according to the disclosure of the present specification.

Referring to FIG. 13, UE, RAN, AMF, SMF, UPF, and PCF are shown. Communication between the UE and network nodes (eg, AMF, SMF, UPF, PCF) may be performed via the RAN.

In step S1301, the UE may activate PS Data Off. The UE may transmit information related to activation of PS Data Off (eg, information indicating that PS Data Off of the UE is activated) to the network. Information related to the activation of PS Data Off (eg, information indicating that PS Data Off of the UE is activated) may be transmitted to the SMF and the PCF through the AMF. For reference, the AMF only serves to transmit the NAS message (information related to the activation of PS Data Off) transmitted by the terminal to the SMF, the AMF may not know whether information related to the activation of PS Data Off exists in the NAS message. For reference, the MA PDU session of the UE may be established, the information related to the activation of PS Data Off (eg, information indicating that the PS Data Off of the UE is activated) may be information related to the activation of the PS Data Off related to the MA PDU session.

In step S1302, the PCF may determine a policy based on information related to the activation of PS Data Off (eg, information indicating that PS Data Off of the UE is activated). For example, the PCF is based on PS Data Off enabled for the MA PDU session, the PCF may update the PCC rule, such that packets for services not belonging to the list of 3GPP PS Data Off Exempt Services are delivered only through non-3GPP access. For example, the PCF can set the Steering Mode included in the PCC rule to "Active-Standby" ("Active-Standby" where non-3GPP access is active access and there is no standby access for downlink direction and uplink direction).

By updating the PCC rule by the PCF, data related to services not belonging to the list of 3GPP PS Data Off Exempt Services are delivered to the UE through non-3PGPP access, and data related to services belonging to the list of 3GPP PS Data Off Exempt Services are may be delivered to the UE via 3GPP access and/or non-3GPP access.

In step S1303, the PCF may transmit the PCC rule to the SMF. The SMF may newly generate (or modify) the ATSSS rule and the N4 rule, if necessary, according to the updated PCC rule. For example, all services belonging to the non-PS Data Off Exempt service service (eg, services not belonging to the PS Data Off Exempt service) use Active-Standby mode, and according to that Active access is set to non-3GPP access, the SMF may generate an ATSSS rule and an N4 rule.

In step S1304, the SMF may deliver the ATSSS rule to the UE. The UE may know how to route uplink traffic through 3GPP access and non-3GPP access based on ATSSS rules. For example, based on the ATSSS rule, the UE transmits data related to a service that does not belong to the list of 3GPP PS Data Off Exempt Services to the network through non-3PGPP access, and the UE transmits data related to a service belonging to the list of 3GPP PS Data Off Exempt Services to the network through 3GPP access and/or non-3GPP access.

In step S1305, the SMF may deliver the N4 rule to the UPF. The UPF may inform how to route downlink traffic for the UE through 3GPP access and non-3GPP access, based on the N4 rule. For example, based on the N4 rule, UPF delivers data related to a service that does not belong to the list of 3GPP PS Data Off Exempt Services to the UE through non-3PGPP access, and delivers data related to a service that belonging to the list of 3GPP PS Data Off Exempt Services Data related to the UE through 3GPP access and/or non-3GPP access.

1. First Example of the Disclosure of the Present Specification

Hereinafter, an example of the operation of the network and/or the terminal according to the first example of the disclosure of the present specification (eg, the operation of the network and/or the terminal when PS Data Off is activated for the MA PDU session) will be described. For reference, in the first example of the disclosure of the present specification, an operation of a network and/or a terminal when PS Data Off is activated in a state in which a MA PDU session is established will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14A:
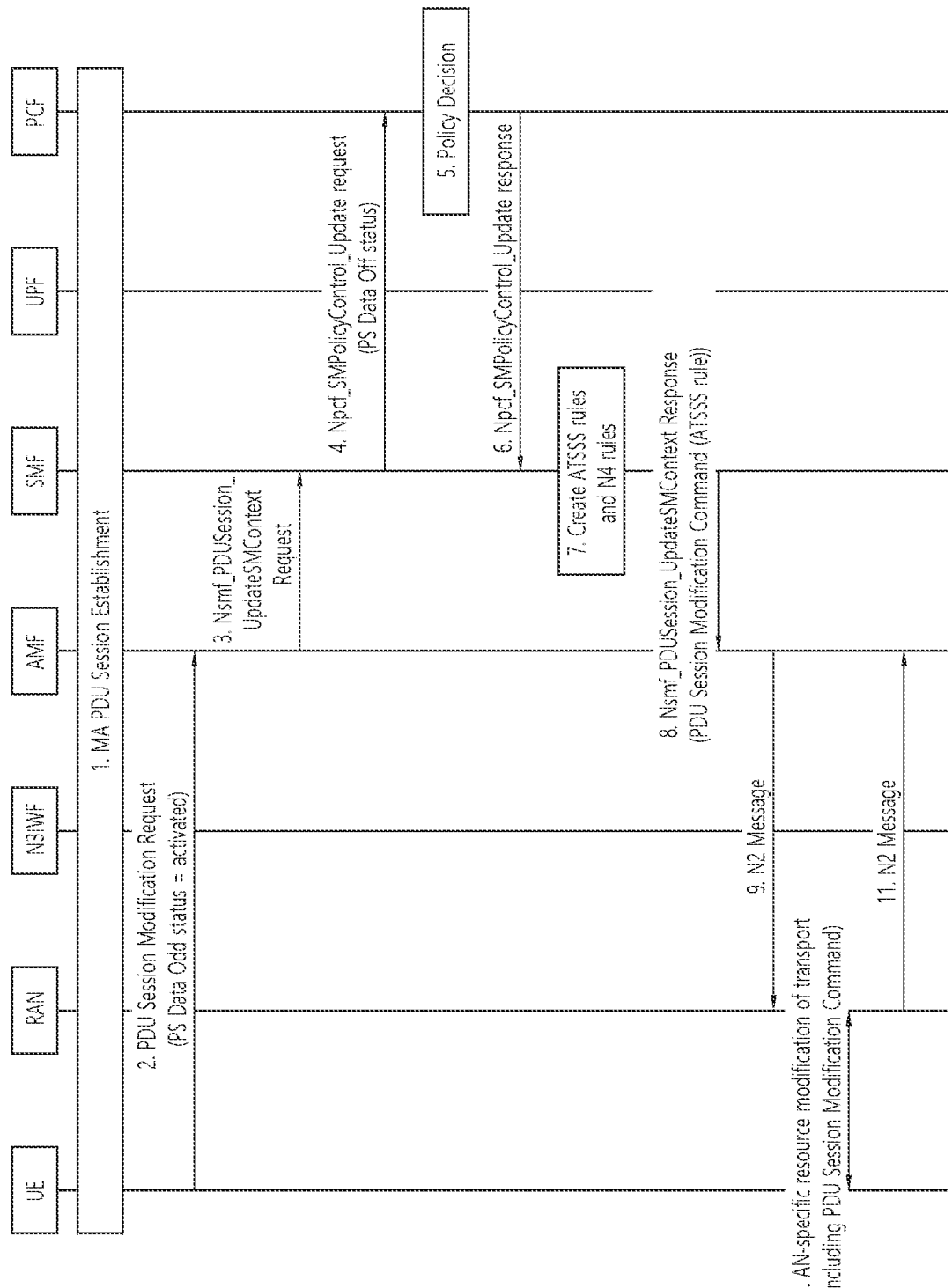
FIGS. 14a and 14b show examples of operation of a network and/or a terminal according to a first example of the disclosure of the present specification.
Figure 14B:
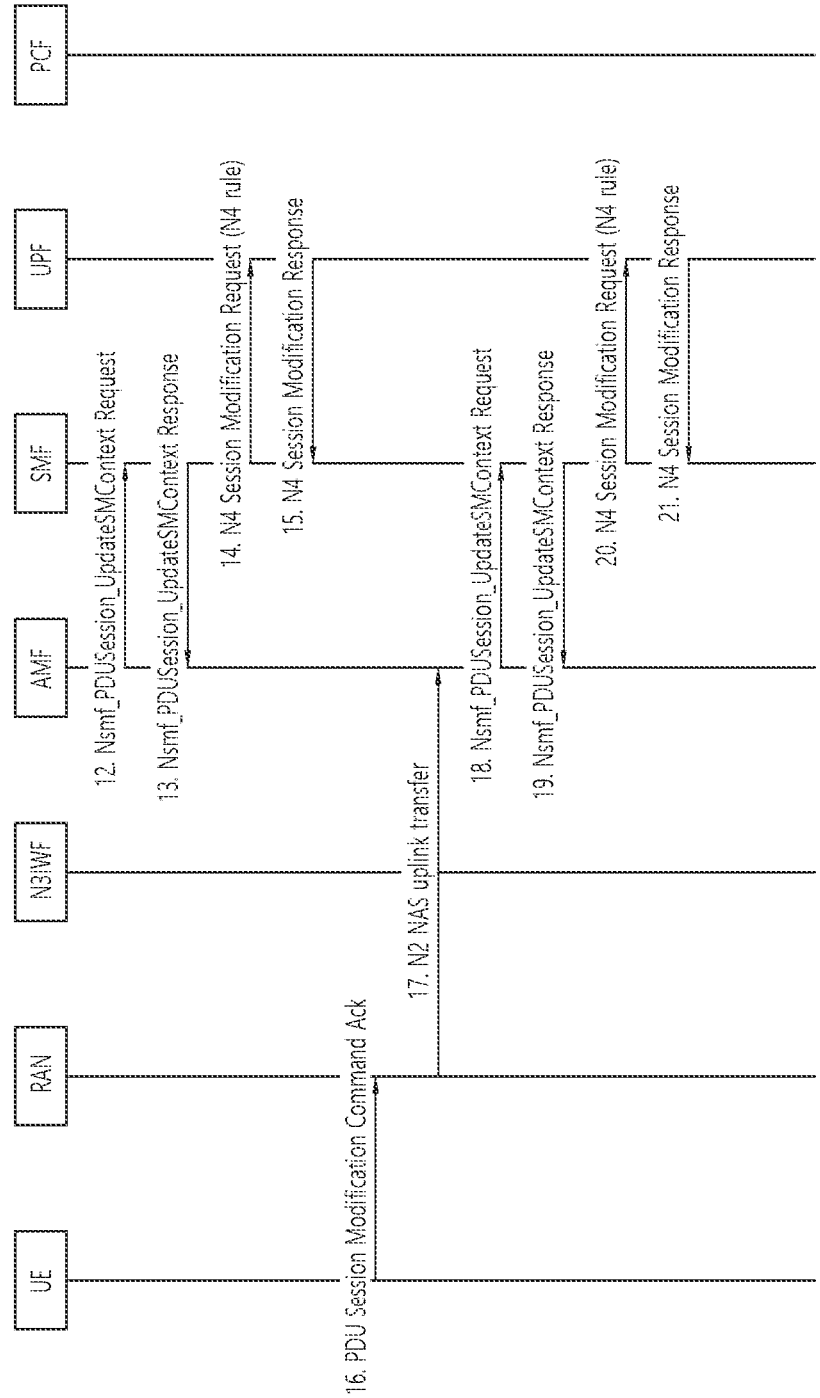

FIGS. 14a and 14b show examples of operation of a network and/or a terminal according to a first example of the disclosure of the present specification.

FIGS. 14a and 14b, UE, RAN, N3IWF, AMF, SMF, UPF, and PCF are shown. Communication between the UE and network nodes (eg, N3IWF, AMF, SMF, UPF, PCF) may be performed via the RAN. For reference, the examples of FIGS. 14a and 14b may be procedures based on the PDU session modification procedure described above with reference to FIGS. 7a and 7b and FIGS. 12a and 12b.

1) A MA PDU session may be generated between a UE (eg, UE) and a network. For example, the MA PDU session establishment procedure may be performed through procedures such as those described in FIGS. 6a and 6b, 11a and 11b, and <ATSSS Procedure>.

2) The UE may notify the network of the PS Data Off status by transmitting a PDU session modification request message. For example, when the user activates the PS Data Off status, the UE may inform the PS Data Off status to the network while performing the MA PDU session modification procedure (eg, the MA PDU session modification procedure described with reference to FIGS. 12a and 12b). To this end, when transmitting the PDU session modification request message, the UE may transmit the PDU session modification request message by setting PS Data Off status in the PCO included in the PDU session modification request message to activated.

3) The AMF may transmit the PDU session modification request message sent by the UE to the SMF. For example, the AMF may transmit an Nsmf_PDUSession_UpdateSM-Context Request message in order to transmit the PDU session modification request message transmitted by the UE to the SMF. A message (eg, Nsmf_PDUSession_UpdateSM-Context Request message) transmitted by the AMF to the SMF may include information on PS Data Off status.

4) The SMF may transmit the PS Data Off status transmitted by the terminal to the PCF. For example, the SMF may transmit an Npcf_SMPolicyControl_Update request to the PCF in order to transmit the PS Data Off status transmitted by the UE to the PCF.

5) The PCF may determine a policy. For example, the PCF may generate (or update) a PCC rule according to the PS Data Off status transmitted by the SMF. As an example, PS Data Off status is activated (that is, PS Data Off is activated), if the corresponding session (eg, a PDU session related to PS Data Off status transmitted by the UE) is an MA PDU session, the PCF may update the Steering mode included in the MA PDU Session Control information included in the PCC rule. Unlike the prior art, the PCF may not change the gate status of the PCC rule. In this case, it may not be necessary to update the PCC rule related to the service belonging to the PS Data Off Exempt service. The PCF may set (or update) the PCC rule so that Active-Standby mode is used for all services belonging to the non-PS Data Off Exempt service service (eg, services not belonging to the PS Data Off Exempt service). In addition, the PCF may set active access to non-3GPP access and not set standby access. Through this, services belonging to the non-PS Data Off Exempt service service (eg, services not belonging to the PS Data Off Exempt service) may be transmitted to the UE only through non-3GPP access. At this time, since the service belonging to the PS Data Off Exempt service can be serviced from all accesses (eg 3GPP access and non-3GPP access), the PCF may determine the steering mode regardless of the PS Data Off status for the service belonging to the PS Data Off Exempt service according to the operator's policy.

If, before PS Data Off status is activated, all services belonging to all non-PS Data Off Exempt service services (eg, services not belonging to PS Data Off Exempt service) may be using Active-Standby mode. In this situation, when active access is set to non-3GPP access and standby access is not set, the PCF does not need to update the PCC rule.

6) The PCF may transmit the updated PCC rule to the SMF. For example, the PCF may transmit an Npcf_SMPolicyControl_Update response including the updated PCC rule to the SMF.

7) The SMF may generate a new ATSSS rule and an N4 rule, if necessary, according to the updated PCC rule. At this time, according to the PCC rule set (or updated) by the PCF in step 5), the SMF may generate an ATSSS rule and an N4 rule, such that all services belonging to non-PS Data Off Exempt service (eg, services not belonging to PS Data Off Exempt service) use Active-Standby mode, and Active access is set to non-3GPP access. That is, for services belonging to the non-PS Data Off Exempt service service (eg, services not belonging to the PS Data Off Exempt service), Active-Standby mode is used (e.g. Active access is set to non-3GPP access, Standby access is not set), the PCF may generate an ATSSS rule and an N4 rule.

8) The SMF may transmit the updated ATSSS rule to the terminal. For example, the SMF may transmit a PDU Session Modification Command message (including the updated ATSS rule) to the UE. The SMF may transmit the Nsmf_PDUSession_UpdateSMContext Response message to the AMF. The Nsmf_PDUSession_UpdateSMContext Response message may include a PDU Session Modification Command message including the updated ATSS rule.

9-13) Steps 9) to 13) may be performed in the same manner as in the prior art (eg, the PDU session modification procedure described in FIGS. 12a and 12b). For example, in step 9), the AMF may send an N2 message to the RAN. Here, the N2 message may include a PDU Session Modification Command message including the updated ATSS rule. In step 10), the RAN may transmit a PDU Session Modification Command message including the updated ATSS rule to the UE. For example, the RAN may transmit a PDU Session Modification Command message (including an updated ATSS rule) to the UE through an AN-specific resource modification of transport message. In step 11), the RAN may transmit an N2 message to the AMF. In step 12), the AMF may transmit an Nsmf_PDUSession_UpdateSMContext Request message to the SMF, and in step 13), the SMF may transmit an Nsmf_PDUSession_UpdateSMContext Response message to the AMF.

14-15) The SMF may transmit the N4 rule updated in step 7) to the UPF. For example, the SMF may perform the N4 Session Modification procedure to transmit the updated N4 rule to the UPF. The SMF may transmit an N4 session modification request message including the updated N4 rule to the UPF, and the UPF may transmit an N4 session modification response message to the SMF.

16-19) Steps 16) to 19) may be performed in the same manner as in the prior art (eg, the PDU session modification procedure described in FIGS. 12a and 12b). For example, in step 16), the UE may transmit a PDU session modification command Ack message to the RAN. In step 17), the RAN may transmit an N2 NAS uplink transfer message to the AMF. In step 18), the AMF may transmit an Nsmf_PDUSession_UpdateSMContext Request message to the SMF. In step 19), the SMF may transmit an Nsmf_PDUSession_UpdateSMContext Response message to the AMF.

20-21) The SMF may transmit the N4 rule updated in step 7) to the UPF. For example, the SMF may perform the N4 Session Modification procedure to transmit the updated N4 rule to the UPF. The SMF may transmit an N4 session modification request message including the updated N4 rule to the UPF, and the UPF may transmit an N4 session modification response message to the SMF. For reference, steps 14) and 15) may be performed, and steps 20) and 21) may not be performed. Alternatively, steps 14) and 15) may not be performed, and steps 20) and 21) may be performed. Alternatively, steps 14) and 15) may be performed, and steps 20) and 21) may be performed.

When the operation according to the example of FIGS. 14a and 14b is performed, the UE may receive or transmit data related to services belonging to the non-PS Data Off Exempt service service (eg, services not belonging to the PS Data Off Exempt service) through non-3GPP access. The UE may receive or transmit data related to services belonging to service of the PS Data Off Exempt service through 3GPP access and/or non-3GPP access. For example, based on the updated ATSSS rule, the terminal may transmit data related to services belonging to service of the non-PS Data Off Exempt service (eg, services not belonging to the PS Data Off Exempt service) through non-3GPP access. For example, based on the updated N4 rule, UPF may transmit data related to services belonging to the non-PS Data Off Exempt service service (eg, services not belonging to the PS Data Off Exempt service) to the UE through non-3GPP access.

2. Second Example of the Disclosure of the Present Specification

Hereinafter, an example of the operation of the network and/or the terminal according to the second example of the disclosure of the present specification (eg, the operation of the network and/or the terminal when PS Data Off is activated for the MA PDU session) will be described. For reference, in the first example of the disclosure of the present specification, the operation of the network and/or the terminal according to the MA PDU session establishment procedure when PS Data Off is activated will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15B:
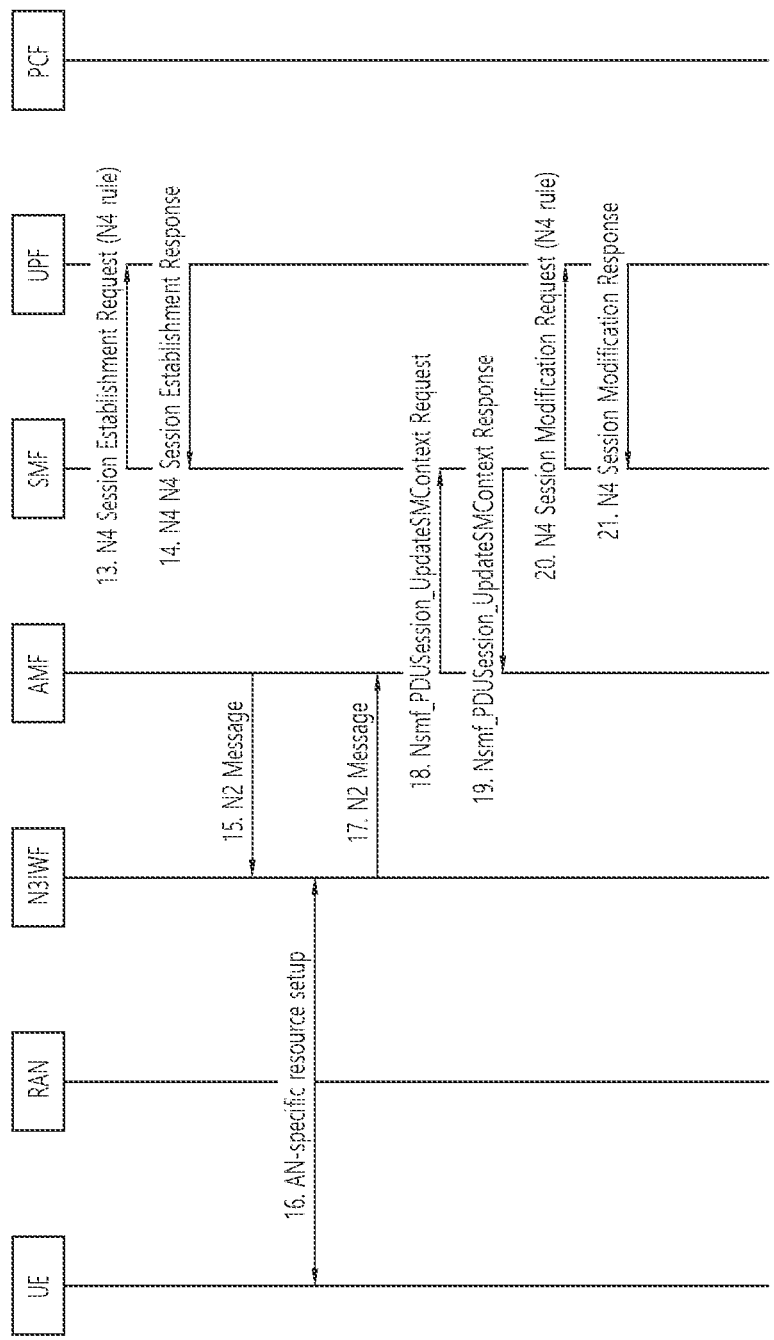

FIGS. 15a and 15b show examples of operation of a network and/or a terminal according to a second example of the disclosure of the present specification.

Refer to FIGS. 15a and 15b, UE, RAN, N3IWF, AMF, SMF, UPF, and PCF are shown. Communication between the UE and network nodes (eg, N3IWF, AMF, SMF, UPF, PCF) may be performed via the RAN. For reference, the examples of FIGS. 15a and 15b may be procedures based on the PDU session establishment procedure described above with reference to FIGS. 6a and 6b and FIGS. 11a and 11b.

1) The UE may transmit a PDU Session Establishment Request message (PDU Session Establishment Request message) to generate (or establish) a MA PDU Session. The operation of the UE transmitting the PDU session establishment request message may be performed in the same manner as the PDU session establishment procedure described with reference to FIGS. 11a and 11b. The UE may inform the network of the PS Data Off status while performing the PDU session establishment procedure. For example, the terminal may transmit the PDU session establishment request message by transmitting the PS Data Off status in the PCO included in the PDU session establishment request message to activated to notify the PS Data Off status.

2) The AMF may transmit the PDU session establishment request message transmitted by the UE to the SMF. For example, the AMF may transmit the Nsmf_PDUSession_UpdateSMContext Request message in order to transmit the PDU Session Establishment Request message transmitted by the UE to the SMF.

3) The SMF may transmit the PS Data Off status transmitted by the terminal to the PCF. For example, the SMF may transmit an Npcf_SMPolicyControl_Update request to the PCF in order to transmit the PS Data Off status transmitted by the UE to the PCF.

4) The PCF may determine a policy. For example, the PCF may generate (or update) a PCC rule according to the PS Data Off status transmitted by the SMF. For example, if PS Data Off status is activated (ie, PS Data Off is activated) and the corresponding session (eg, PDU session related to PS Data Off status transmitted by the UE) is an MA PDU session, the PCF may update Steering mode included in the MA PDU Session Control information included in the PCC rule. Unlike the prior art, the PCF may not change the gate status of the PCC rule. In this case, it may not be necessary to update the PCC rule related to the service belonging to the PS Data Off Exempt service. The PCF may set (or update) the PCC rule so that Active-Standby mode is used for all services belonging to the service of non-PS Data Off Exempt service (eg, services not belonging to the PS Data Off Exempt service). In addition, the PCF may set active access to non-3GPP access and not set standby access. Through this, services belonging to service of the non-PS Data Off Exempt service (eg, services not belonging to the PS Data Off Exempt service) may be transmitted to the UE only through non-3GPP access. At this time, since the service belonging to the PS Data Off Exempt service can be serviced in all accesses (eg 3GPP access and non-3GPP access), the PCF may determine the steering mode regardless of the PS Data Off status for the service belonging to the PS Data Off Exempt service according to the operator's policy.

If, before PS Data Off status is activated, there may be a situation in which all services belonging to non-PS Data Off Exempt service services (eg, services not belonging to PS Data Off Exempt service) are using Active-Standby mode. In this situation, when active access is set to non-3GPP access and standby access is not set, the PCF does not need to update the PCC rule.

5) The PCF may transmit the updated PCC rule to the SMF. For example, the PCF may transmit an Npcf_SMPolicyControl_Update response including the updated PCC rule to the SMF.

6) The SMF may newly generate the ATSSS rule and the N4 rule, if necessary, according to the updated PCC rule. At this time, according to the PCC rule set (or updated) by the PCF in step 4), the SMF may generate an ATSSS rule and an N4 rule, such that all services belonging to the non-PS Data Off Exempt service service (eg, services not belonging to the PS Data Off Exempt service) may use the Active-Standby mode, and set the Active access to non-3GPP access. That is, the PCF may generate ATSSS rule and N4 rule, such that Active-Standby mode is used (e.g. Active access is configured as non-3GPP access, Standby access is not configured) for services belonging to the non-PS Data Off Exempt service service (eg, services not belonging to the PS Data Off Exempt service).

7) The SMF may transmit the updated ATSSS rule to the terminal. For example, the SMF may transmit a PDU Session Establishment Accept message (including the updated ATSS rule) to the UE. The SMF may transmit the Nsmf_PDUSession_UpdateSMContext Response message to the AMF. The Nsmf_PDUSession_UpdateSMContext Response message may include a PDU Session Establishment Accept message including the updated ATSS rule.

8-12) Steps 8) to 12) may be performed in the same manner as in the prior art. For example, in step 8), the AMF may send an N2 message to the RAN. Here, the N2 message may include a PDU session establishment accept message including the updated ATSS rule. In step 9), the RAN may transmit a PDU session establishment accept message including the updated ATSS rule to the UE. For example, the RAN may transmit a PDU session establishment accept message (including an updated ATSS rule) to the UE through an AN-specific resource modification of transport message. In step 10), the RAN may transmit an N2 message to the AMF. In step 11), the AMF may transmit an Nsmf_PDUSession_UpdateSMContext Request message to the SMF, and in step 12), the SMF may transmit an Nsmf_PDUSession_UpdateSMContext Response message to the AMF.

13-14) The SMF may transmit the N4 rule updated in step 6) to the UPF. For example, the SMF may perform the N4 Session Establishment procedure to transmit the updated N4 rule to the UPF. The SMF may transmit an N4 session modification request message including the updated N4 rule to the UPF, and the UPF may transmit an N4 session modification response message to the SMF.

15-19) Steps 15 to 19) may be performed in the same manner as in the prior art (eg, the PDU session establishment procedure described with reference to FIGS. 11a and 11b). For example, in step 15), the AMF may send an N2 message to the RAN. In step 16), the UE may transmit a PDU session modification command Ack message to the RAN. In step 17), the RAN may transmit an N2 NAS uplink transfer message to the AMF. In step 18), the AMF may transmit an Nsmf_PDUSession_UpdateSMContext Request message to the SMF. In step 19), the SMF may transmit an Nsmf_PDUSession_UpdateSMContext Response message to the AMF.

20-21) The SMF may transmit the N4 rule updated in step 7) to the UPF. For example, the SMF may perform the N4 Session Modification procedure to transmit the updated N4 rule to the UPF. The SMF may transmit an N4 session modification request message including the updated N4 rule to the UPF, and the UPF may transmit an N4 session modification response message to the SMF. For reference, steps 13) and 14) may be performed, and steps 20) and 21) may not be performed. Alternatively, steps 13) and 14) may not be performed, and steps 20) and 21) may be performed. Alternatively, steps 13) and 14) may be performed, and steps 20) and 21) may be performed.

For reference, the following content may be applied to the disclosure of the present specification. If the MA PDU session is made only with non-3GPP access (eg, when the MA PDU session is established only through non-3GPP access), the UE does not need to transmit the PS Data Off status to the network even if the PS Data Off status is updated (eg, activated). This is because, in this case, services belonging to the non-PS Data Off Exempt service service (eg, services not belonging to the PS Data Off Exempt service) may be transmitted through non-3GPP access. However, in this case, the UE may transmit a PDU session establishment request message through 3GPP access for subsequent access addition for the MA PDU Session (eg, when adding 3GPP access). At this time, the terminal should transmit PS Data Off status. If the user has activated the PS Data Off status, the UE may transmit the PDU session establishment request message by setting the PS Data Off status in the PCO included in the PDU session establishment request message to activated. Then, in a manner similar to the procedure described with reference to FIGS. 14A and 14B or 15A and 15B, the PCF transmits the updated PCC rule to the SMF in the PDU establishment procedure, and the SMF sends the updated ATSS rule and the N4 rule to the terminal and UPF.

In addition, with respect to the disclosure of the present specification, the following description may be applied. In a situation where the MA PDU Session is generated in both 3GPP access and non-3GPP access, the UE may not be able to transmit NAS signaling through 3GPP access. In this case, the UE may notify the network of a change (activated or deactivated) of PS Data Off status through non-3GPP access or through a PDU Session Modification procedure (eg, by transmitting a PDU session modification request message).

A third example of the disclosure of the present specification described below is an example in which the contents described in the disclosure of the present specification are applied to the description related to 3GPP PS Data Off. The contents described in the first example and the second example of the disclosure of the present specification may be applied to the third example of the disclosure of the present specification. In addition, the contents described in the third example of the disclosure of the present specification may also be applied to the disclosure of the present specification.

3. Third Example of the Disclosure of the Present Specification

A third example of the disclosure of the present specification describes content related to PS Data Off of an MA PDU session according to the disclosure of the present specification.

For MA PDU sessions, PS Data Off status may not affect data transmission through non-3GPP access.

However, according to the prior art, when the PS Data Off status is activated, the PCF modifies the PCC rule so that the gate status is set to "closed". According to the prior art, since the same logic is applied for the MA PDU session, all services that do not belong to 3GPP PS Data Off Exempted services are blocked by the UPF. In order for these services (eg all services not belonging to 3GPP PS Data Off Exempted services) to be transmitted over non-3GPP access, the PCF must not block gate status.

Also, for PDU sessions associated with non-3GPP access, the network shall not apply PS Data Off.

According to the third example of the disclosure of this specification, when PS Data Off is activated, for the MA PDU session, the PCF may update the Steering Mode so that services that do not belong to 3GPP PS Data Off Exempted services to be transmitted through non-3GPP access.

According to a third example of the disclosure of this specification, the PCF may not apply PS Data Off for a PDU session associated with non-3GPP access.

When the content according to the third example of the disclosure does not apply, for the MA PDU session, although services not belonging to 3GPP PS Data Off Exempted services should be allowed through non-3GPP access, services not belonging to 3GPP PS Data Off Exempted services may be blocked.

When 3GPP PS Data Off is activated by a user, traffic for 3GPP access except for 3GPP PS Data Off Exempt Services may be blocked. 3GPP PS Data Off Exempt Services, even though 3GPP PS Data Off is activated by a user, may be a service that is allowed in both the downlink direction and the uplink direction.

When the PCF is deployed, the PCF may not apply 3GPP PS Data Off for the PDU session associated with non-3GPP access. If PCF is not deployed, SMF may not apply 3GPP PS Data Off for PDU sessions associated with non-3GPP access.

When the PCF is deployed, the PCF may set a list of 3GPP PS Data Off Exempt Services. In addition, the PCF may set a Policy Control Request Trigger of a 3GPP PS Data Off status change used by the SMF to notify the PCF of all changes of 3GPP PS Data Off.

For reference, for PCF, a list of 3GPP PS Data Off Exempt Services may be configured for each DNN. According to operator policy, the list of 3GPP PS Data Off Exempt Services for DNN is empty, or the list of 3GPP PS Data Off Exempt Services may allow any service within that DNN.

For reference, in the case of a PDU session used for the IMS service, 3GPP Data Off Exempt Services may be implemented in the IMS domain. The policy set in the PCF may ensure that the IMS service is allowed when the 3GPP PS Data Off of the UE is set to "activated". For example, the policy set in the PCF may treat any service in a well-known IMS DNN (well-known IMS DNN) as 3GPP Data Off Exempt Services.

When the PCF is notified of the activation of 3GPP PS Data Off, while all other packets are discarded, the PCF may update the PCC rule so that only packets for services belonging to the list of 3GPP PS Data Off Exempt Services can be delivered.

For MA PDU session, PS Data Off status may not affect data transmission through non-3GPP access. When the PCF is notified of the activation of 3GPP PS Data Off for the MA PDU session, the PCF may update the PCC rules so that packets for services that do not belong to the list of 3GPP PS Data Off Exempt Services are delivered only through non-3GPP access.

For reference, in order for SMF/UPF to prevent services that do not belong to the list of 3GPP PS Data Off Exempt Services, if the service is controlled by dynamic PCC rules, the PCF can modify the PCC rules as follows. As an example, for the downlink direction and the uplink direction (selectively for the uplink direction), the PCF may modify the PCC rule by configuring gate status to "closed" within all dynamic PCC rule. Alternatively, the PCF may remove these dynamic PCC rules. If a service is controlled by a predefined PCC rule, the PCF may deactivate the predefined PCC rule. A PCC rule with a wildcard service dataflow filter can be one of the PCC rules that is modified, removed, or disabled in this way. In this case, it may be necessary for the PCF to simultaneously install or activate PCC rules for data off exemption services. When services are controlled by pre-defined PCC rules (dynamic PCC rules), the PCF may deactivate these predefined PCC rules. The PCC rule with wild-carded service data flow filters can be one of the PCC rules that is modified, removed, or deactivated. In this case, the PCF may simultaneously install or enable PCC rules for 3GPP PS Data Off Exempt Services.

For example, for one PDU session, four PCC rules (eg, PCC rules A, B, C, D) may be activated. Here, PCC rule A may indicate 3GPP PS Data Off Exempt Service. In this case, if 3GPP PS Data Off is activated, the PCF may modify, or delete/deactivate PCC rules B, C and D. For example, if PCC rules B, C and D are dynamic PCC rules, the PCF may modify PCC rules B, C and D, closing the gate in the downlink direction and in the uplink direction (selectively for the uplink direction)(e.g., by setting the gate status in the dynamic PCC rule to "closed"). For example, if PCC rules B, C and D are predefined PCC rules, the PCF may remove or deactivate PCC rules B, C and D. Since PCC Rule A indicates 3GPP PS Data Off Exempt Service, PCC Rule A does not need to be changed. Assuming PCC Rule B contains a wildcard service data flow filter with some 3GPP PS Data Off Exempt Service enabled, to enable downlink traffic and optionally uplink traffic for 3GPP PS Data Off Exempt Service, the PCF may install additional PCC rule E or activate PCC rule E.

For reference, the network configuration may enable one or more PCC rules to be activated for a PDU session in order to prevent deletion of an existing PDU session or in order to prevent fail to establish a PDU session.

In the case of MA PDU sessions, in order for the SMF/UPF to prevent data related to services that does not belong to the list of 3GPP PS Data Off Exempted Services from being delivered through 3GPP access, if the service is controlled by dynamic PCC rules, the PCF may modify (or update) the PCC rules. For example, instead of modifying the gate status to "closed", the PCF may configure the Steering Mode to "Active-Standby" (e.g. "Active-Standby" having non-3GPP access as an active access and without standby access for downlink direction and uplink direction).

When the PCF receives the service information from the AF, the PCF may check whether the requested service information belongs to 3GPP PS Data Off Exempt Services. For example, when the PCF receives service information for a PDU session related to 3GPP access from the AF, the PCF may check whether the requested service information belongs to 3GPP PS Data Off Exempt Services. If the requested service belongs to 3GPP PS Data Off Exempt Services, the PCF may cause the requested service to be delivered via 3GPP access and/or non-3GPP access. If the requested service does not belong to 3GPP PS Data Off Exempt Services, the PCF may reject the service request. For example, if the requested service does not belong to 3GPP PS Data Off Exempt Services and the requested service is not associated with the MA PDU session, the PCF may reject the service request.

When the PCF is notified of the deactivation of 3GPP PS Data Off, the PCF can make policy control decisions and perform PCC rule actions to check whether the service is allowed according to the user's subscription and operator policy (regardless of whether the service is on the list of 3GPP PS Data Off Exempt Services or not).

When the PCF is not deployed, for example, a predefined PCC rule may be set in the SMF to ensure the following:
When the SMF receives a notification of the activation of 3GPP PS Data Off, while all other downlink packets and uplink packets are discarded, the SMF enables that the UPF deliver a downlink packet and optionally an uplink packet for a service belonging to the list of 3GPP PS Data Off Exempt Services.
When the SMF receives notification of the activation of 3GPP PS Data Off for the MA PDU session, while all other downlink packets and uplink packets are discarded, the SMF enables packets for services that do not belong to the list of 3GPP PS Data Off Exempt Services to be delivered only through non-3GPP access.
When the SMF receives a notification about the deactivation of 3GPP PS Data Off, the SMF may allow the downlink packet and the uplink packet to be delivered in the UPF according to the operator's policy for the subscriber.

For reference, for SMF, two sets of predefined PCC rules may be set. One of the two sets may be a set for UE 3GPP PS Data Off status "inactive (or deactivated)", and the other set may be a set for UE 3GPP PS Data Off status "active (or activated)". The set of predefined PCC rules for UE 3GPP PS Data Off status "active (or activated)" can be identical with the set of predefined PCC rules for UE 3GPP PS Data Off status "inactive (or deactivated)" except for the following two differences:
For a single access PDU session, the set of predefined PCC rules for UE 3GPP PS Data Off status "active (or activated)" has the following two differences with the set of predefined PCC rules for UE 3GPP PS Data Off status "inactive (or deactivated)". For single access PDU sessions, 1) in all other PCC rules (PCC rules for services not belonging to the list of 3GPP PS Data Off Exempt Services), for the downlink direction and optionally for the uplink direction, the gate status may be "closed", otherwise 2) all services belonging to the list of 3GPP PS Data Off Exempt Services can be expressed as PCC rules that allow traffic to pass through.
In case of MA PDU session, a set of predefined PCC rules for UE 3GPP PS Data Off status "active (or activated)" may have the following two differences with a set of predefined PCC rules for UE 3GPP PS Data Off status "inactive (or deactivated)". In the case of the MA PDU session, all services belonging to the list of 3GPP PS Data Off Exempt Services may be represented by a PCC rule that allows traffic to pass through. On the other hand, in all other PCC rules (PCC rules for services not belonging to the list of 3GPP PS Data Off Exempt Services), Steering Mode may be "Active-Standby" (non-3GPP access is active access and "Active-Standby" without standby access for downlink direction and uplink direction).

When the SMF receives notification of a change in UE 3GPP PS Data Off status, the SMF may replace the current active set of the predefined PCC rule with a set of other predefined PCC rules.

When the UE 3GPP PS Data Off state is "active" and handover occurs from one access-system to another access system, in order to block downlink and optionally uplink traffic for services not belonging to the list of 3GPP PS Data Off Exempt Services only through this 3GPP access, the PCF may perform the operations described above.

As described in the disclosure of this specification, the terminal may transmit a message (eg, a PDU session establishment request message or a PDU session modification request message, etc.) by setting the PS Data Off status to activated. In this case, the PCF does not change the Gate Status when generating (or updating) the PCC rule for the MA PDU Session, and may set Active-Standby mode to be used for services belonging to the non-PS Data Off Exempted service. In addition, the PCF may set the active access to non-3GPP access and not set the standby access in the active-standby mode.

As described in the disclosure of this specification, 3GPP PS Data Off may be supported even for the MA PDU session. For example, as described in the disclosure of this specification, when 3GPP PS Data Off is used for the MA PDU session, efficient communication may be supported. For example, as described in the disclosure herein, by applying PS Data Off to the MA PDU session, when the terminal activates PS Data Off, service continuity can be ensured by enabling data transmission (eg, communication of data related to a service not belonging to the PS data off exempt service) through non-3GPP access.

For reference, the operation of the terminal (eg, UE) described in this specification may be implemented by the apparatus of FIGS. 16 to 20 to be described below. For example, the terminal (eg, UE) may be the first device 100a or the second device 100b of FIG. 17. For example, an operation of a terminal (eg, UE) described herein may be processed by one or more processors 1020a or 1020b. The operation of the terminal described in this specification may be stored in one or more memories 1010a or 1010b in the form of an instruction/program (e.g. instruction, executable code) executable by one or more processors 1020a or 1020b. One or more processors 1020a or 1020b control one or more memories 1010a or 1010b and one or more transceivers 1031a or 1031b, and execute instructions/programs stored in one or more memories 1010a or 1010b as disclosed herein, thereby perform the operation of the terminal (eg, UE) described in the disclosure of the present specification.

In addition, instructions for performing an operation of a terminal (eg, a UE) described in the disclosure of the present specification may be stored in a non-volatile computer-readable storage medium in which it is recorded. The storage medium may be included in one or more memories 1010a or 1010b. And, the instructions recorded in the storage medium may be executed by one or more processors 1020a or 1020b to perform the operation of the terminal (eg, a UE) described in the disclosure of the present specification.

For reference, the operation of a network node (eg, AMF, SMF, UPF, PCF, etc.) or a base station (eg, NG-RAN, gNB, gNB(NB-IoT), gNB(NR) eNB, RAN, etc.) described in this specification will be may be implemented by the apparatus described below in FIG. 16 to 20. For example, the network node (eg, AMF, SMF, UPF, PCF, etc.) or a base station (eg, NG-RAN, gNB, gNB(NB-IoT), gNB(NR) eNB, RAN, etc.) may be the first device 100a or the second device 100b of FIG. 17. For example, the operation of the network node (eg, AMF, SMF, UPF, PCF, etc) described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and may perform the operation of the network node (eg, AMF, SMF, UPF, PCF, etc.) or the base station (eg, NG-RAN, gNB, gNB(NB-IoT), gNB(NR) eNB, RAN, etc.) described in the disclosure of the present specification by executing instructions/programs stored in one or more memories 1010a or 1010b as disclosed herein.

In addition, the instructions for performing the operation of the network nodes described in the disclosure of this specification (eg, AMF, SMF, UPF, PCF, etc.) or a base station (eg, NG-RAN, gNB, gNB(NB-IoT), gNB(NR) eNB, RAN, etc.) may be stored in a non-volatile computer-readable storage medium recording. The storage medium may be included in one or more memories 1010a or 1010b. And, the instructions recorded in the storage medium are executed by one or more processors 1020a or 1020b to perform operations of the network node (eg, AMF, SMF, UPF, PCF, etc.) or base station (eg, NG-RAN, gNB, gNB (NB-IoT), gNB(NR) eNB, RAN, etc.) described in the disclosure of the present specification.

IV. Examples to which the Disclosure of the Present Specification Applies

Although not limited thereto, the various descriptions, functions, procedures, suggestions, methods, and/or operational flowcharts of the disclosure of the present specification disclosed in this document may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 16:
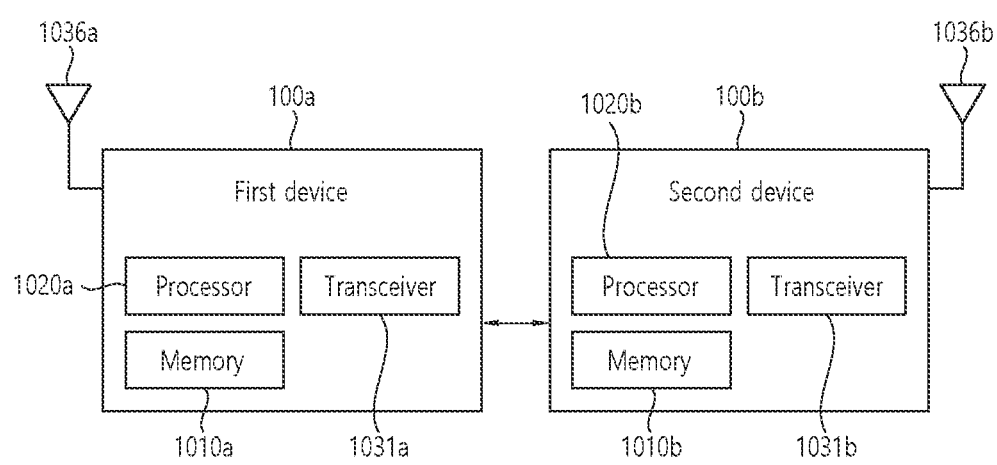
FIG. 16 illustrates a wireless communication system according to an embodiment.

FIG. 16 illustrates a wireless communication system according to an embodiment.

Referring to FIG. 16, the wireless communication system may include a first device 100a and a second device 100b. The first device 100a and the second device 100b may be wireless communication devices capable of performing wireless communication.

The first device 100a may be a UE described in the disclosure of the present specification. Or, the first device 100a may be a base station, a network node (e.g. SMF #1, AMF #1, UPF #1, SMF #2, AMF #2, UPF #2, MME #1, SGW #1, PGW #1, MME #2, SGW #2, PGW #2, etc), a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g. SMF #1, AMF #1, UPF #1, SMF #2, AMF #2, UPF #2, MME #1, SGW #1, PGW #1, MME #2, SGW #2, PGW #2, etc) described in the disclosure of the present specification. Or, the second device 100b may be a base station, a network node, a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the objector background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 17:
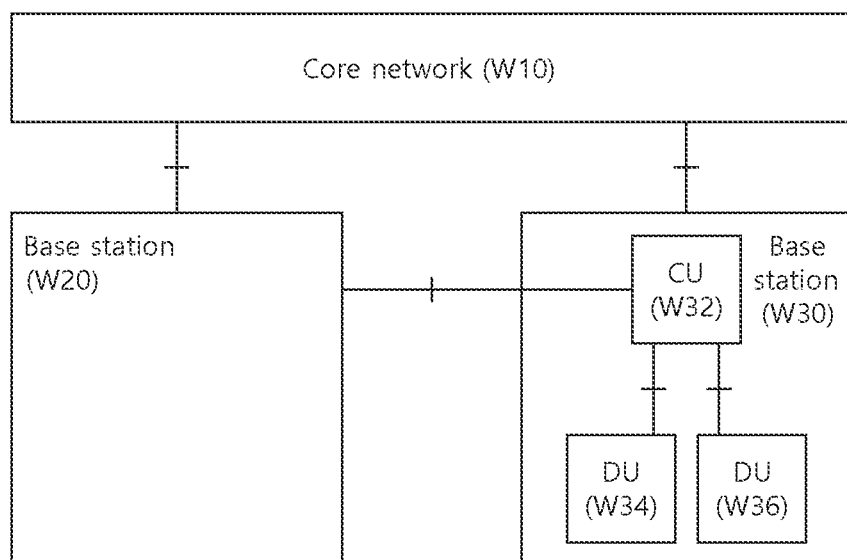
FIG. 17 illustrates a block diagram of a network node according to an embodiment.

FIG. 17 illustrates a block diagram of a network node according to an embodiment.

In particular, FIG. 17 is a diagram illustrating in detail a case in which a base station is divided into a Central Unit (CU) and a Distributed Unit (DU).

Referring to FIG. 17, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 18:
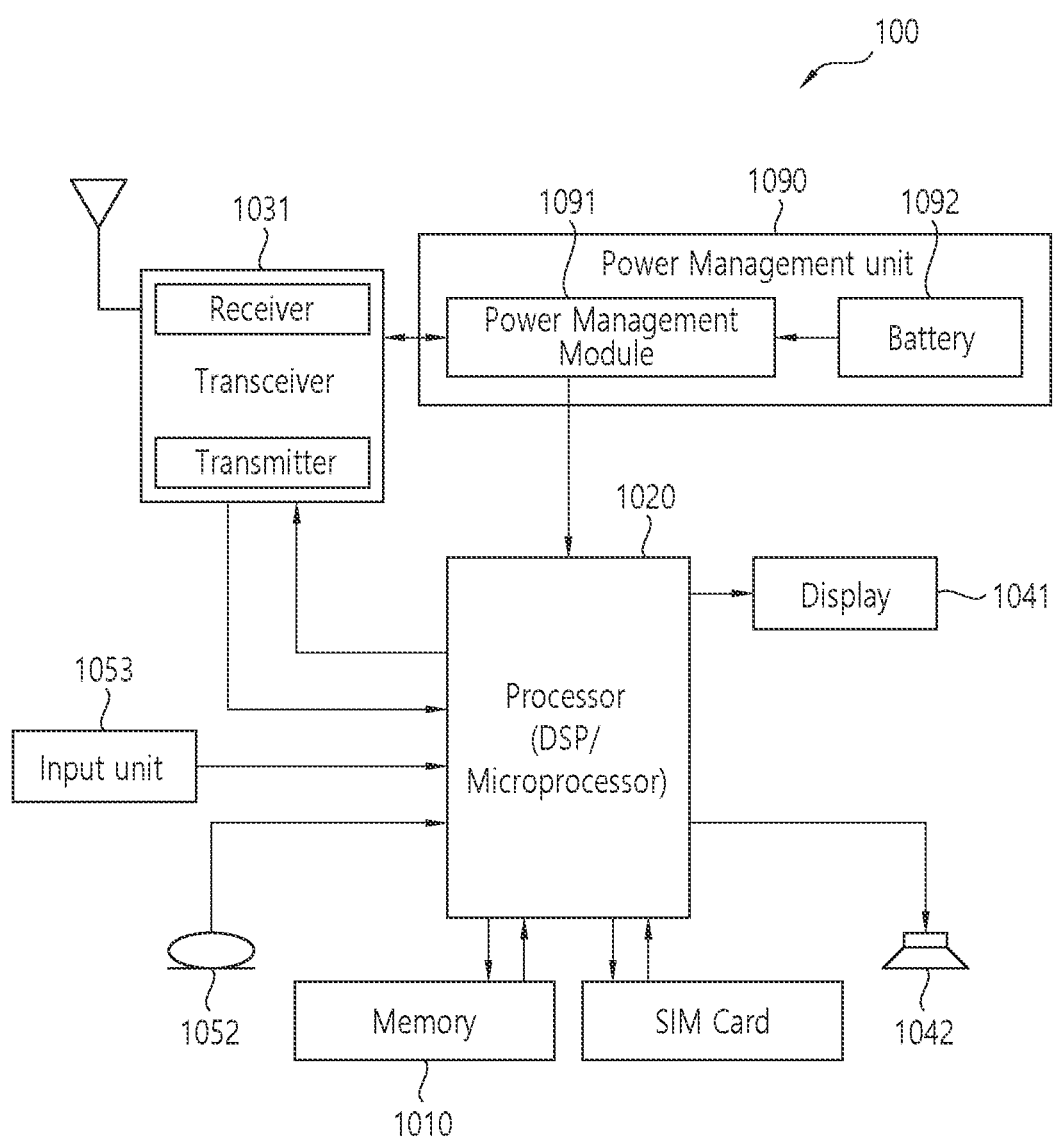
FIG. 18 is a block diagram illustrating a configuration of a UE according to an embodiment.

FIG. 18 is a block diagram illustrating a configuration of a UE according to an embodiment.

In particular, the UE 100 shown in FIG. 18 is a diagram illustrating the first device of FIG. 16 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 19:
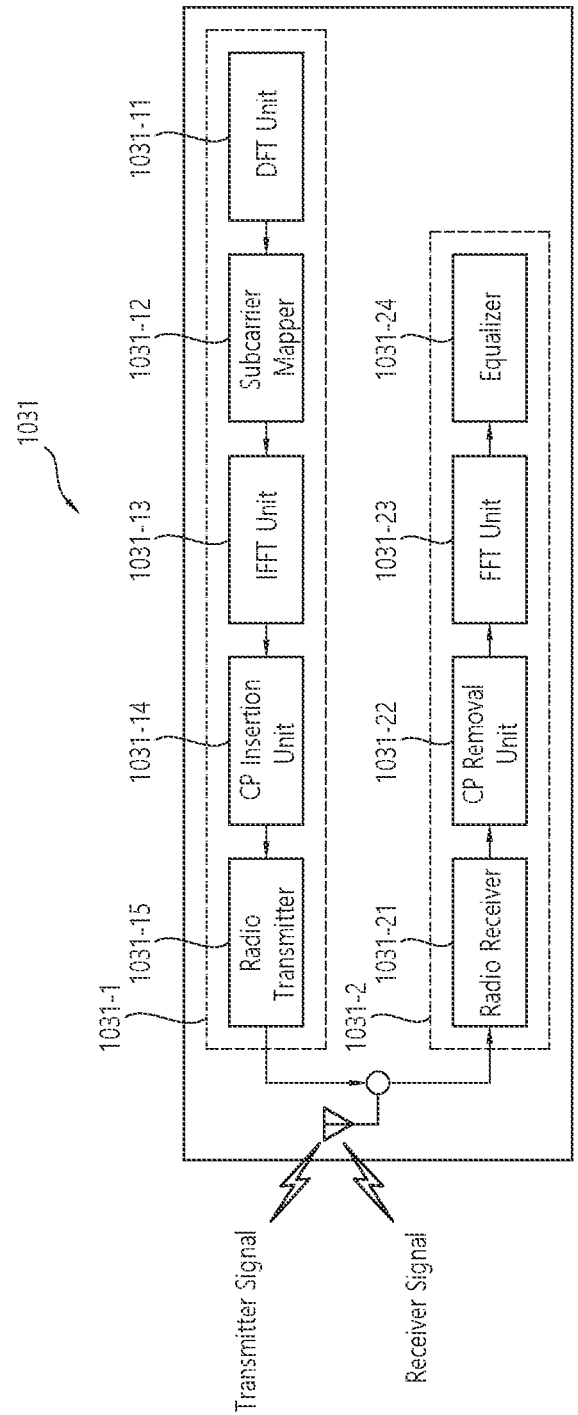
FIG. 19 is a detailed block diagram illustrating the transceiver of the first device shown in FIG. 16 or the transceiver of the device shown in FIG. 18 in detail.

FIG. 19 is a detailed block diagram illustrating the transceiver of the first device shown in FIG. 16 or the transceiver of the device shown in FIG. 18 in detail.

Referring to FIG. 19, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Figure 20:
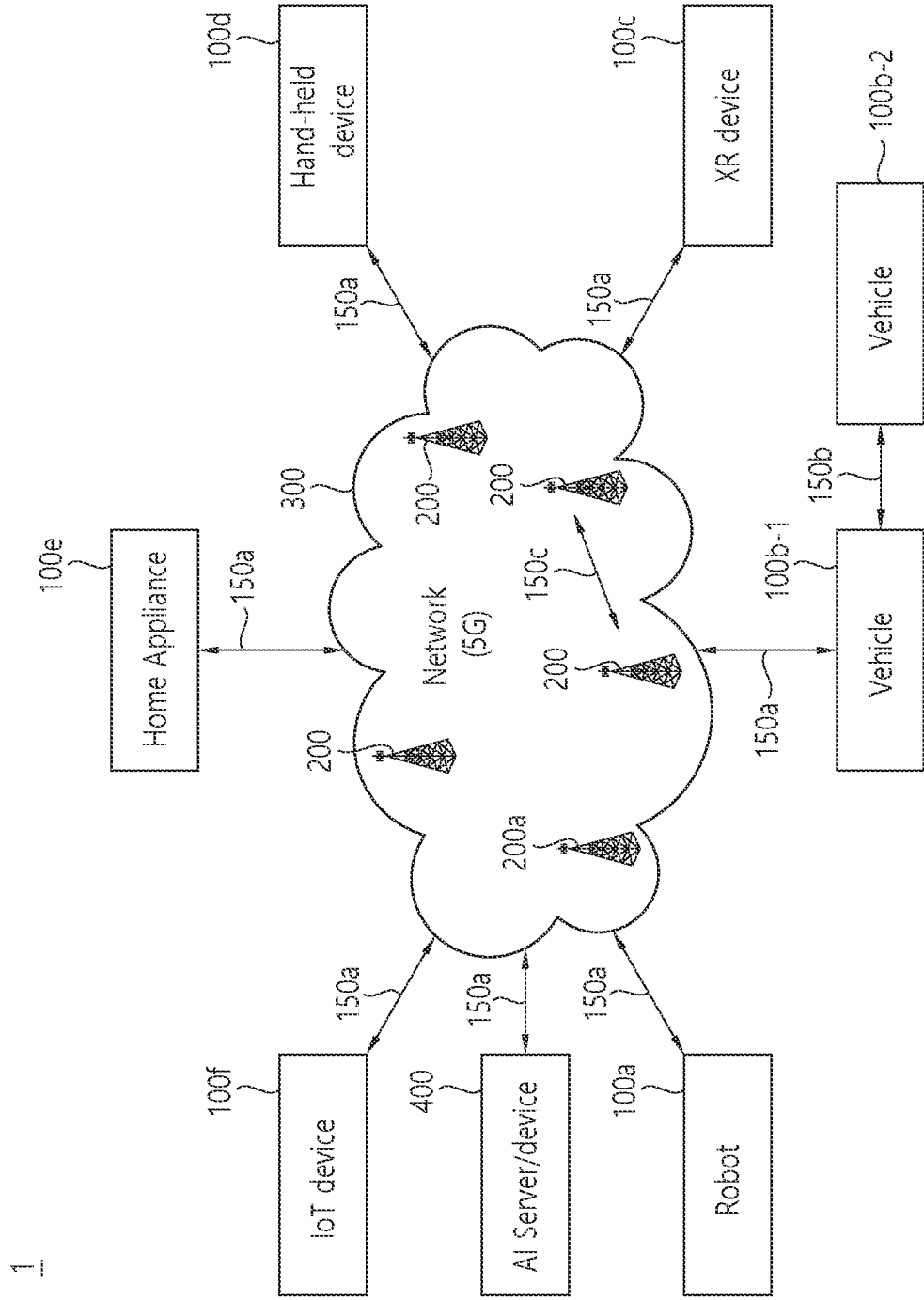
FIG. 20 illustrates a communication system 1 applied to the disclosure of the present specification.

FIG. 20 illustrates a communication system 1 applied to the disclosure of the present specification.

Referring to FIG. 20, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100-d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

Here, the wireless communication technology implemented in the wireless devices 100*a* to 100*f*, 400, and 100 and 200 of FIG. 17 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100*a* to 100*f*, 400, 100 and 200 in FIG. 17 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100*a* to 100*f*, 400, and 100 and 200 of FIG. 17 of the present specification may include at least any one of ZigBee, Bluetooth, and low-power wide area network (Low) in consideration of low-power communication. Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100*a* to 100*f* may be connected to the network 300 via the base station 200. An Artificial Intelligence (AI) technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the base stations 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between wireless device 100*a* to 100*f* and base station 200, between base station 200/base station 200. Herein, the wireless communication/connections may be established through various RATs (e.g., 5G NR) such as uplink/downlink communication 150*a*, sidelink communication (or Device-to-Device (D2D) communication) 150*b*, inter-base station communication 150*c* (e.g., relay, Integrated Access and Backhaul (IAB)), etc. The wireless devices 100*a* to 100*f* and the base station 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method comprising:
 receiving, by a network entity related to policy control, information related to PS (Packet Switch) Data Off being activated for a Multi Access (MA) Packet Data Unit (PDU) session of a User Equipment (UE);
 based on the information related to PS Data Off being activated for the MA PDU session of the UE, updating, by the network entity related to the policy control, a Policy and charging control (PCC) rule,
 based on the PCC rule being updated, for 3GPP access, only packets for services belonging to a list of PS Data Off exempt services are forwarded, while all other packets are discarded; and
 transmitting, by the network entity related to the policy control, the updated PCC rule to a network entity related to session management.

2. The method of claim 1, based on that the PCC rule is updated, (i) only data included in the PS Data Off exempt service is transmitted over 3GPP access or non-3GPP access, and (ii) data not included in the PS Data Off exempt service is transmitted over non-3GPP access.

3. The method of claim 1, wherein the updated PCC rule includes information related to Steering Mode, and
 wherein the information related to the Steering mode includes information related to "Active-Standby", in which active access is non-3GPP access and standby access does not exist.

4. The method of claim 1,
wherein even if the PS Data Off is activated, the PS Data Off does not affect packets transmitted over non-3GPP access.

5. The method of claim 1,
wherein the updated PCC rule is used by the network entity related to the session management to generate an Access Traffic Steering, Switching and Splitting (ATSSS) rule to be transmitted to the UE and an N4 rule to be transmitted to a network entity related to user plane.

6. The method of claim 5,
wherein the N4 rule informs the network entity related to the user plane to (i) deliver data included in the PS Data Off exception service through 3GPP access or non-3GPP access, and (ii) deliver data not included in the PS Data Off exception service through non-3GPP access.

7. The method of claim 5,
wherein the ATSSS rule informs the UE to (i) transmit data included in the PS Data Off exception service through 3GPP access or non-3GPP access, and (ii) transmit data not included in the PS Data Off exception service through non-3GPP access.

8. A method for performing communication related to a Multi Access (MA) Packet Data Unit (PDU) session, the method performed by a User Equipment (UE) and comprising:
activating PS (Packet Switch) Data Off for the MA PDU session;
transmitting a message including information indicating that the PS Data Off is activated for the MA PDU session; and
receiving a message including an Access Traffic Steering, Switching and Splitting (ATSSS) rule in response to the message,
wherein the ATSSS rule informs that (i) data included in the PS Data Off exception service is delivered through 3GPP access or non-3GPP access, and (ii) data not included in the PS Data Off exception service is delivered through non-3GPP access.

9. A network entity related to policy control comprising:
at least one processor; and
at least one memory for storing instructions and operably electrically connectable with the at least one processor,
wherein the operations performed based on the execution of the instructions by the at least one processor include:
receiving information related to PS (Packet Switch) Data Off being activated for a Multi Access (MA) Packet Data Unit (PDU) session of a User Equipment (UE);
based on the information related to PS Data Off being activated for the MA PDU session of the UE, updating a Policy and charging control (PCC) rule,
based on that the PCC rule is updated, for 3GPP access, only packets for services belonging to a list of PS Data Off exempt services are forwarded, while all other packets are discarded; and
transmitting the updated PCC rule to a network entity related to session management.

\* \* \* \* \*